(12) United States Patent
Horiuchi et al.

(10) Patent No.: US 10,284,814 B2
(45) Date of Patent: *May 7, 2019

(54) TRANSMISSION MANAGEMENT SYSTEM, TRANSMISSION SYSTEM, INFORMATION PROCESSING APPARATUS, AND TRANSMISSION MANAGEMENT METHOD

(71) Applicant: RICOH COMPANY, LTD., Tokyo (JP)

(72) Inventors: Takeshi Horiuchi, Tokyo (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,178

(22) Filed: Jul. 25, 2016

(65) Prior Publication Data

US 2017/0034475 A1   Feb. 2, 2017

(30) Foreign Application Priority Data

Jul. 30, 2015   (JP) .................. 2015-150466

(51) Int. Cl.
  *H04M 11/00*  (2006.01)
  *H04N 7/14*  (2006.01)
  (Continued)

(52) U.S. Cl.
  CPC ......... *H04N 7/147* (2013.01); *H04L 12/1827* (2013.01); *H04L 65/1066* (2013.01);
  (Continued)

(58) Field of Classification Search
  USPC ...................................... 348/14.01
  See application file for complete search history.

(56) References Cited

U.S. PATENT DOCUMENTS 8,850,230 B2   9/2014 Schnell et al.
2004/0264482 A1* 12/2004 Kang ................ H04L 29/06027
                                                         370/401

(Continued)

FOREIGN PATENT DOCUMENTS

EP   3 032 811 A1   6/2016
JP   2011-510539    3/2011

(Continued)

OTHER PUBLICATIONS

Extended Search Report dated Sep. 28, 2016 in European Patent Application No. 16181253.2.

(Continued)

*Primary Examiner* — Maria El-Zoobi
(74) *Attorney, Agent, or Firm* — Oblon, McClelland, Maier & Neustadt, L.L.P.

(57) ABSTRACT

A transmission management system for managing a session transmitting content data via a relay apparatus, includes a service management unit configured to manage service management information including service identification information identifying service content to be provided to each of transmission terminals, and service content corresponding to the service identification information; a first acquisition unit configured to acquire the service identification information for the transmission terminal participating in the session; a second acquisition unit configured to acquire terminal capacity information indicating service content available for the transmission terminal; an extraction unit configured to extract the service content available for the transmission terminal, based on service content corresponding to the acquired service identification information and service content corresponding to the acquired terminal capacity information; and a determination unit configured to determine service content of the transmission terminal par- (Continued)

ticipating in the session, based on the extracted service content.

7 Claims, 21 Drawing Sheets

(51) Int. Cl.
*H04N 7/15* (2006.01)
*H04L 29/06* (2006.01)
*H04L 12/18* (2006.01)
*H04L 29/08* (2006.01)

(52) U.S. Cl.
CPC .......... *H04L 65/403* (2013.01); *H04L 65/601* (2013.01); *H04L 65/605* (2013.01); *H04L 67/14* (2013.01); *H04L 67/16* (2013.01); *H04L 67/303* (2013.01); *H04N 7/15* (2013.01)

(56) References Cited

U.S. PATENT DOCUMENTS

| | | | |
|---|---|---|---|
| 2012/0147127 A1* | 6/2012 | Satterlee | H04N 7/152 348/14.08 |
| 2015/0381665 A1 | 12/2015 | Horiuchi et al. | |
| 2016/0156684 A1 | 6/2016 | Hinohara et al. | |

FOREIGN PATENT DOCUMENTS

| | | |
|---|---|---|
| JP | 2016-012843 | 1/2016 |
| WO | WO 2015/019792 A1 | 2/2015 |

OTHER PUBLICATIONS

Office Action dated Feb. 12, 2018 in corresponding European Patent Application No. 16 181 253.2, citing documents AX and AY therein, 9 pages.

"3rd Generation Partnership Project; Technical Specification Group Core Network and Terminals; Conferencing using the IP Multimedia (IM), Core Network (CN) subsystem; Stage 3 (Release 12)", 3GPP TS 24.147 V12.5.0 (Mar. 2015), Technical Specification, vol. CT WG1, No. v12.5.0, XP050927778, pp. 1-209.

"3rd Generation Partnership Project; Technical Specification Group Services and System Aspects; IP Multimedia Subsystem (IMS); Stage 2; (Release 12)", 3GPP TS 23.228 V12.5.0 (Jun. 2014), Technical Specification, vol. SA WG2, No. v12.5.0, XP050774098, Jun. 20, 2014, pp. 1-310.

"$3^{rd}$ Generation Partnership Project; Technical Specification Group Core Network and Terminals; Characteristics of the IP Multimedia Services Identity Module (ISIM) application (Release 13)", 3GPP Standard; 3GPP TS 31.103, $3^{rd}$ Generation Partnership Project (3GPP), Mobile Competence Centre; 650, Route Des Lucioles; F-06921 Sophia-Antipolis Cedex; France, vol. CT WG6, No. V13. 0.0, Jul. 3, 2015, pp. 1-44 XP050965864.

European Office Communication for EP 16 181 253.2-1213, dated Aug. 15, 2018, 8 pages.

* cited by examiner

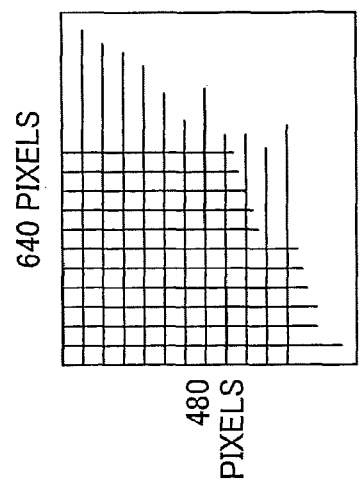
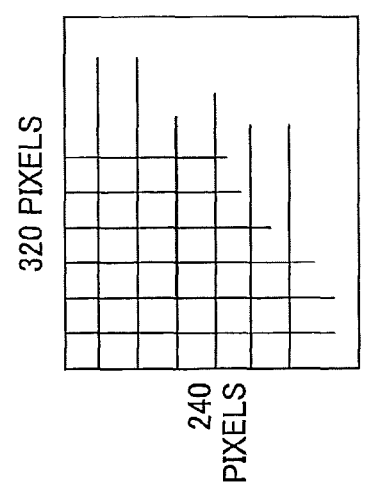
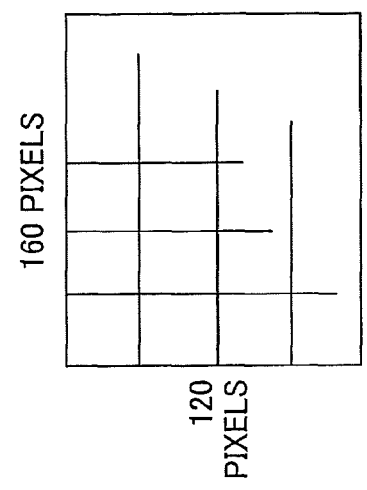

FIG.10A

| RELAY APPARATUS ID | OPERATION STATE | DATE/TIME RECEIVED | IP ADDRESS OF RELAY APPARATUS | MAXIMUM DATA TRANSMISSION RATE (Mbps) |
|---|---|---|---|---|
| 111a | ONLINE | 20xx.4.10.10:00 | 1.2.1.2 | 100 |
| 111b | OFFLINE | 20xx.4.10.13:10 | 1.2.2.2 | 1000 |
| 111c | ONLINE | 20xx.4.10.13:20 | 1.3.1.2 | 100 |
| 111d | ONLINE | 20xx.4.10.13:30 | 1.3.2.2 | 10 |

| TERMINAL ID | PASSWORD |
|---|---|
| 01aa | aaaa |
| 01ab | abab |
| 01ba | baba |
| ... | ... |

| TERMINAL ID | DESTINATION NAME | OPERATION STATE | DATE/TIME RECEIVED | IP ADDRESS OF TERMINAL |
|---|---|---|---|---|
| 01aa | AA TERMINAL, TOKYO OFFICE, JAPAN | ONLINE (COMMUNICATION OK) | 20xx.4.10.13:40 | 1.2.1.3 |
| 01ab | AB TERMINAL, OSAKA OFFICE, JAPAN | OFFLINE | 20xx.4.09.12:00 | 1.2.1.4 |
| ... | ... | ... | ... | ... |
| 01ba | BA TERMINAL, BEIJING OFFICE, CHINA | ONLINE (COMMUNICATION OK) | 20xx.4.10.13:45 | 1.2.2.3 |
| 01bb | BB TERMINAL, SHANGHAI OFFICE, CHINA | ONLINE (INTERRUPTED) | 20xx.4.10.13:50 | 1.2.2.4 |
| ... | ... | ... | ... | ... |
| 01ca | CA TERMINAL, WASHINGTON D.C. OFFICE, U.S. | OFFLINE | 20xx.4.10.12:45 | 1.3.1.3 |
| 01cb | CB TERMINAL, NEW YORK OFFICE, U.S. | ONLINE (COMMUNICATING) | 20xx.4.10.13:55 | 1.3.1.4 |
| ... | ... | ... | ... | ... |
| 01da | DA TERMINAL, BERLIN OFFICE, EUROPE | ONLINE (COMMUNICATING) | 20xx.4.08.12:45 | 1.3.2.3 |
| 01db | DB TERMINAL, LONDON OFFICE, EUROPE | ONLINE (COMMUNICATION OK) | 20xx.4.10.12:45 | 1.3.2.4 |
| ... | ... | ... | ... | ... |

| REQUEST SOURCE TERMINAL ID | DESTINATION TERMINAL ID |
|---|---|
| 01aa | 01ab, 01ba, 01db |
| 01ab | 01aa, 01ca, 01cb |
| 01ba | 01aa,01ab,01ca,01cb,01da,01db |
| ... | ... |
| 01db | 01aa,01ab,01ba,...,01da,01ca,01cb,...,01da |

| SESSION ID | RELAY APPARATUS ID | REQUEST SOURCE TERMINAL ID | DESTINATION TERMINAL ID | DELAY TIME | DELAY INFORMATION DATE/TIME RECEIVED |
|---|---|---|---|---|---|
| se1 | 111a | 01aa | 01bb 01cb 01db | 200 ms | 20xx/4/10 13:00 |
| se2 | 111a | 01ba | 01ca 01cc | 50 ms | 20xx/4/10 13:10 |
| se3 | 111a | 01bb | 01da | 400 ms | 20xx/4/10 13:20 |
| ... | ... | ... | ... | ... | ... |

| SERVICE ID | QUALITY ITEM | QUALITY |
|---|---|---|
| sv901 | RECEPTION FRAME RATE | 30 fps |
| | | 20 fps |
| | TRANSMISSION FRAME RATE | 20 fps |
| | | 10 fps |
| | RECEPTION IMAGE QUALITY | INTERMEDIATE-RESOLUTION |
| | | LOW-RESOLUTION |
| | TRANSMISSION IMAGE QUALITY | INTERMEDIATE-RESOLUTION |
| | | LOW-RESOLUTION |
| | RECEPTION SAMPLING RATE | 44.1 kHz |
| | | 22.05 kHz |
| | TRANSMISSION SAMPLING RATE | 44.1 kHz |
| | | 22.05 kHz |
| | ... | ... |
| sv902 | RECEPTION FRAME RATE | 20 fps |
| | | 10 fps |
| | TRANSMISSION FRAME RATE | 40 fps |
| | | 30 fps |
| | RECEPTION IMAGE QUALITY | LOW-RESOLUTION |
| | TRANSMISSION IMAGE QUALITY | INTERMEDIATE-RESOLUTION |
| | RECEPTION SAMPLING RATE | 22.05 kHz |
| | TRANSMISSION SAMPLING RATE | 22.05 kHz |
| | ... | ... |
| ... | ... | ... |

FIG.13

| TERMINAL ID | QUALITY ITEM | QUALITY |
|---|---|---|
| 01aa | RECEPTION FRAME RATE | 30 fps |
| | | 20 fps |
| | TRANSMISSION FRAME RATE | 40 fps |
| | | 20 fps |
| | RECEPTION IMAGE QUALITY | LOW-RESOLUTION |
| | TRANSMISSION IMAGE QUALITY | INTERMEDIATE-RESOLUTION |
| | RECEPTION SAMPLING RATE | 44.1 kHz |
| | | 22.05 kHz |
| | TRANSMISSION SAMPLING RATE | 44.1 kHz |
| | | 22.05 kHz |
| | ... | ... |
| 01ab | RECEPTION FRAME RATE | 30 fps |
| | | 20 fps |
| | TRANSMISSION FRAME RATE | 30 fps |
| | | 20 fps |
| | RECEPTION IMAGE QUALITY | HIGH-RESOLUTION |
| | | INTERMEDIATE-RESOLUTION |
| | | LOW-RESOLUTION |
| | TRANSMISSION IMAGE QUALITY | HIGH-RESOLUTION |
| | | INTERMEDIATE-RESOLUTION |
| | | LOW-RESOLUTION |
| | TRANSMISSION SAMPLING RATE | 22.05 kHz |
| | RECEPTION SAMPLING RATE | 22.05 kHz |
| | ... | ... |
| ... | ... | ... |

| SERVICE ID | RECEPTION FRAME RATE | TRANSMISSION FRAME RATE | RECEPTION IMAGE QUALITY | TRANSMISSION IMAGE QUALITY | RECEPTION SAMPLING RATE | TRANSMISSION SAMPLING RATE |
|---|---|---|---|---|---|---|
| sv901 | GREATER IS PRIORITIZED | GREATER IS PRIORITIZED | HIGHER IMAGE QUALITY IS PRIORITIZED | LOWER IMAGE QUALITY IS PRIORITIZED | SMALLER SAMPLING RATE IS PRIORITIZED | SMALLER SAMPLING RATE IS PRIORITIZED |
| sv902 | SMALLER IS PRIORITIZED | SMALLER IS PRIORITIZED | LOWER IMAGE QUALITY IS PRIORITIZED | LOWER IMAGE QUALITY IS PRIORITIZED | SMALLER SAMPLING RATE IS PRIORITIZED | SMALLER SAMPLING RATE IS PRIORITIZED |
| sv903 | GREATER IS PRIORITIZED | GREATER IS PRIORITIZED | HIGHER IMAGE QUALITY IS PRIORITIZED | HIGHER IMAGE QUALITY IS PRIORITIZED | GREATER SAMPLING RATE IS PRIORITIZED | GREATER SAMPLING RATE IS PRIORITIZED |
| ... | ... | ... | ... | ... | ... | ... |

| SESSION ID | QUALITY ITEM | SERVICE CONTENT | | | 1501 |
|---|---|---|---|---|---|
| se001 | – | TERMINAL ID (01aa) | TERMINAL ID (01ab) | – | ... |
| | RECEPTION FRAME RATE | 30 fps | 20 fps | – | ... |
| | TRANSMISSION FRAME RATE | 20 fps | 30 fps | – | ... |
| | RECEPTION IMAGE QUALITY | LOW-RESOLUTION | LOW-RESOLUTION | – | ... |
| | TRANSMISSION IMAGE QUALITY | INTERMEDIATE-RESOLUTION | INTERMEDIATE-RESOLUTION | – | ... |
| | RECEPTION SAMPLING RATE | 22.05 kHz | 22.05 kHz | – | ... |
| | TRANSMISSION SAMPLING RATE | 22.05 kHz | 22.05 kHz | – | ... |
| | ... | ... | ... | ... | ... |
| se002 | – | TERMINAL ID (01ac) | TERMINAL ID (01ba) | TERMINAL ID (01ca) | |
| | RECEPTION FRAME RATE | 20 fps | 20 fps | 20 fps | ... |
| | TRANSMISSION FRAME RATE | 20 fps | 20 fps | 20 fps | ... |
| | RECEPTION IMAGE QUALITY | INTERMEDIATE-RESOLUTION | INTERMEDIATE-RESOLUTION | INTERMEDIATE-RESOLUTION | ... |
| | TRANSMISSION IMAGE QUALITY | INTERMEDIATE-RESOLUTION | INTERMEDIATE-RESOLUTION | INTERMEDIATE-RESOLUTION | ... |
| | RECEPTION SAMPLING RATE | 22.05 kHz | 22.05 kHz | 22.05 kHz | ... |
| | TRANSMISSION SAMPLING RATE | 22.05 kHz | 22.05 kHz | 22.05 kHz | ... |
| | ... | ... | ... | ... | ... |
| ... | ... | ... | ... | ... | ... |

TRANSMISSION MANAGEMENT SYSTEM, TRANSMISSION SYSTEM, INFORMATION PROCESSING APPARATUS, AND TRANSMISSION MANAGEMENT METHOD

CROSS-REFERENCE TO RELATED APPLICATIONS

The present application claims benefit of priority under 35 U.S.C. § 119 of Japanese Patent Application No. 2015-150466, filed Jul. 30, 2015. The contents of this application are incorporated herein by reference in their entirety.

BACKGROUND OF THE INVENTION

1. Field of the Invention

The disclosures herein generally relate to a transmission management system, a transmission system, an information processing apparatus and a transmission management method.

2. Description of the Related Art

There have been transmission systems each transmitting or receiving content data between a plurality of transmission terminals via a relay apparatus.

Moreover, there have been delivery services each delivering protected media contents based on an identifier stored in a movable component, such as SIM (Subscriber Identity Module) (See, for example, Japanese Translation of PCT International Application Publication No. JP-T-2011-510539).

SUMMARY OF THE INVENTION

It is a general object of at least one embodiment of the present invention to provide transmission management system, a transmission system, an information processing apparatus and a transmission management method that substantially obviate one or more problems caused by the limitations and disadvantages of the related art.

In one embodiment, a transmission management system that manages a session transmitting content data via a relay apparatus, includes a service management unit configured to manage service management information, in which service identification information identifying service content to be provided to each of a plurality of transmission terminals, and service content corresponding to the service identification information are stored preliminarily; a first acquisition unit configured to acquire the service identification information for each of the transmission terminals participating in the session; a second acquisition unit configured to acquire terminal capacity information indicating service content available for each of the transmission terminals participating in the session; an extraction unit configured to extract the service content available for each of the transmission terminals participating in the session, based on service content corresponding to the service identification information acquired by the first acquisition unit and service content corresponding to the terminal capacity information acquired by the second acquisition unit; and a determination unit configured to determine service content of each of the transmission terminals participating in the session, based on the service content extracted by the extraction unit.

BRIEF DESCRIPTION OF THE DRAWINGS

Other objects and further features of embodiments will become apparent from the following detailed description when read in conjunction with the accompanying drawings, in which:

FIGS. 3A to 3C are conceptual diagrams for explaining an example of image quality of image data according to the embodiment;

FIGS. 10A to 10C are conceptual diagrams illustrating an example of a relay apparatus management table, an authentication management table, and a terminal management table according to the embodiment;

FIGS. 11A and 11B are conceptual diagrams illustrating an example of a destination list management table and a session management table according to the embodiment;

FIG. 12 is a conceptual diagram illustrating an example of a service management table according to the embodiment;

FIG. 13 is a conceptual diagram illustrating an example of a terminal capacity management table according to the embodiment;

FIG. 14 is a conceptual diagram illustrating an example of a service priority management table according to the embodiment;

FIG. 15 is a conceptual diagram illustrating a service content management table managed by the relay apparatus according to the embodiment;

DESCRIPTION OF THE PREFERRED EMBODIMENTS

In the following, embodiments of the present invention will be described with reference to the accompanying drawings.

<System Configuration>

Figure 1:
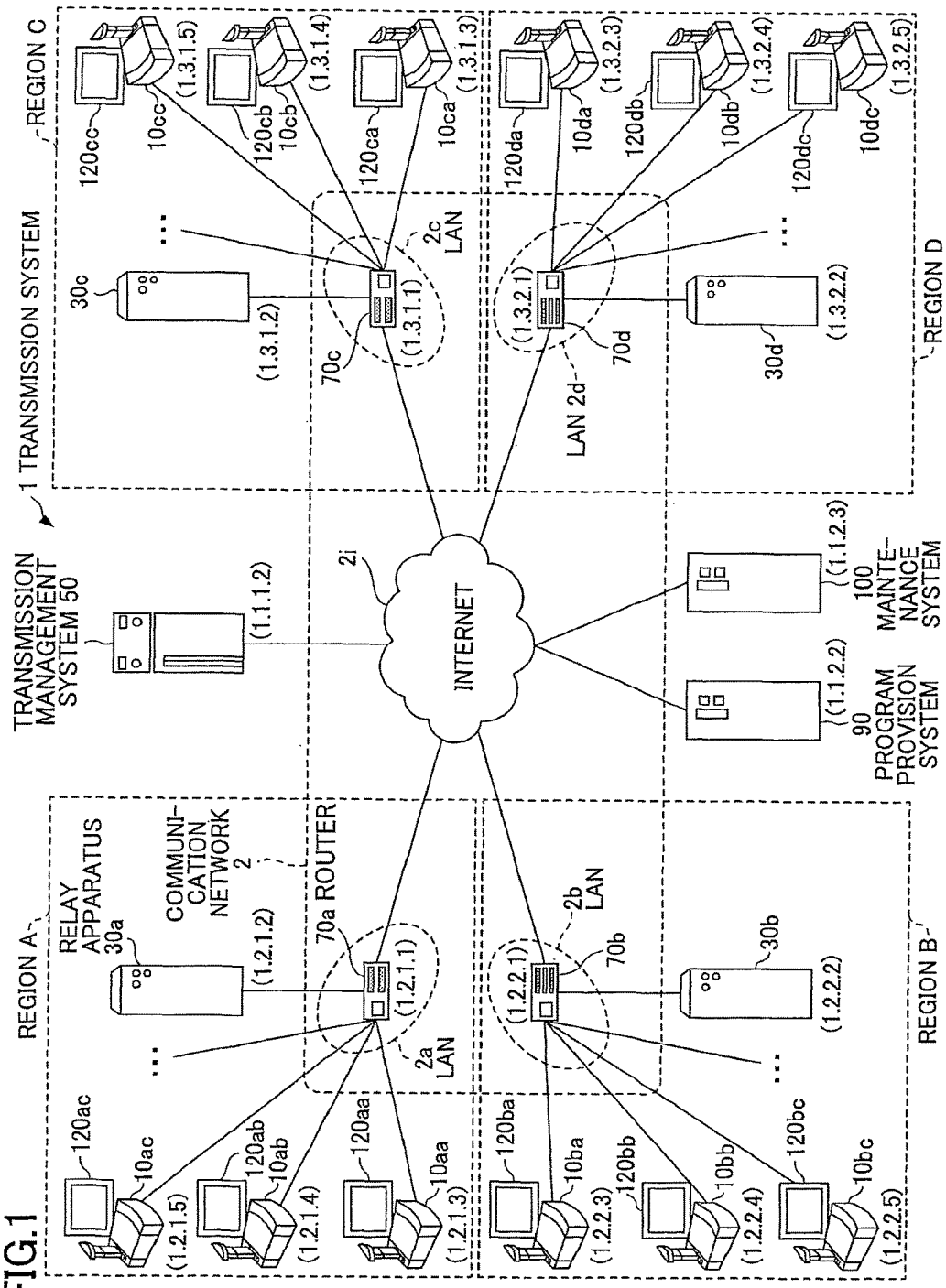
FIG. 1 is a schematic view illustrating an example of a transmission system according to an embodiment of the present invention.
Figure 2:
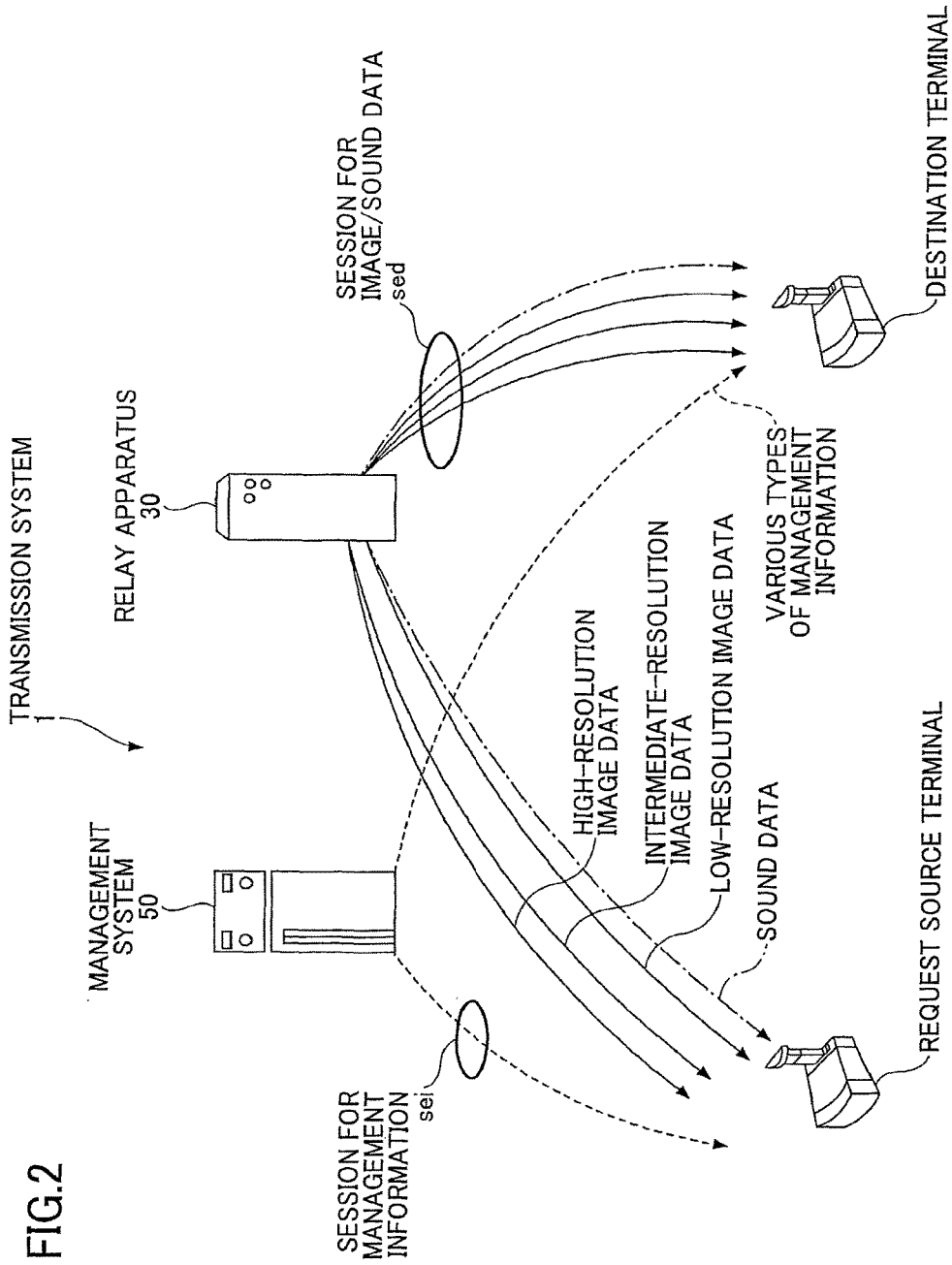
FIG. 2 is a conceptual diagram illustrating an example of a state of transmission or reception of image data, sound data, and various types of management information in the transmission system according to the embodiment.

FIG. 1 is a schematic view of a transmission system according to the embodiments. FIG. 2 is a conceptual diagram illustrating a state of transmission or reception of image data, sound data, and various types of management information in the transmission system. FIGS. 3A to 3C are conceptual diagrams for explaining image quality of image data according to the embodiments.

The transmission system includes a data provision apparatus, which transmits unidirectionally content data from one transmission terminal to the other transmission terminal via a transmission management system, and a communication system, which transfers bidirectionally information, emotion, or the like among a plurality of transmission terminals via a transmission management system. The communication system transfers information, emotion, or the like in two directions among a plurality of communication terminals (corresponding to the "transmission terminals") via a communication management system (corresponding to the "transmission management system"). The communication system is, for example, a video conference system or a video telephone system.

In the embodiments, a video conference system as an example of the communication system, a video conference management system as an example of the communication management system and a video conference terminal as an example of the communication terminal are assumed. Furthermore, a transmission system, a transmission management system and a transmission terminal will be explained. That is, the transmission terminal and the transmission management system according to embodiments of the present invention are applied not only to a video conference system, but also to a communication system or a transmission system.

First, the transmission system 1, as illustrated in FIG. 1, includes a plurality of terminals (10aa, 10ab, . . . ), display devices for the respective terminals (120aa, 120ab, . . . ), a plurality of relay apparatuses (30a, 30b, 30c, and 30d), a transfer management system 50, a program provision system 90, a maintenance apparatus 100 and the like. Moreover, the terminals (10aa, 10ab, . . . ) perform transmission by sending/receiving image data and sound data as an example of content data.

In the following, a "transmission terminal" will be simply denoted as a "terminal", and a "transmission management system" will be simply denoted as a "management system". Moreover, an arbitrary terminal of the terminals (10aa, 10ab, . . . ) is denoted as a "terminal 10". An arbitrary display device of the display devices (120aa, 120ab . . . ) is denoted as a "display device 120". An arbitrary relay apparatus of the relay apparatuses (30a, 30b, 30c, and 30d) is denoted as a "relay apparatus 30". Furthermore, a terminal as a request source, which has required starting the video conference, is denoted as a "request source terminal". A terminal, which is a destination of the request (destination of the relay), is denoted as a "destination terminal".

Moreover, as illustrated in FIG. 2, in the transmission system 1, between the request source terminal and the destination terminal, a session for management information "sei" in order to send/receive various types of management information is established via the management system 50. Moreover, between the request source terminal and the destination terminal, four sessions in order to send/receive four data sets, i.e. image data in high resolution, image data in intermediate resolution, image data in low resolution and voice data, are established via the relay apparatus 30. In the present exemplary embodiment, the four sessions are collectively denoted as a session for image/voice data "sed".

The session for image/voice data "sed" is not necessarily four sessions, but the number of sessions may be greater than or less than four.

Next, a resolution of an image of image data processed in the embodiments will be explained. In the embodiments, as illustrated in FIG. 3A, an image, as a base image, including 160 pixels in the horizontal direction and 120 pixels in the vertical direction will be called a low-resolution image. Moreover, as illustrated in FIG. 3B, an image including 320 pixels in the horizontal direction and 240 pixels in the vertical direction will be called an intermediate-resolution image. Furthermore, as illustrated in FIG. 3C, an image including 640 pixels in the horizontal direction and 480 pixels in the vertical direction will be called as a high-resolution image.

Among them, in a case of transmitting through a narrow band path (communication path having a narrow transmission bandwidth), image data of low image quality including only low-resolution image data, as a base image, are relayed. Moreover, in a case where the bandwidth is relatively wide, image data of intermediate image quality including low-resolution image data, as a base image, and intermediate-resolution image data are relayed. Furthermore, in a case where the bandwidth is quite wide, image data of high image quality including low-resolution image data as a base image, intermediate-resolution image data and high-resolution image data are relayed.

The relay apparatus 30, illustrated in FIG. 1, relays content data between the terminals 10. The management system 50 manages in an integrated fashion a login authentication process from the terminal 10, a status of speech of the terminal 10, the destination list, a status of the communication of the relay apparatus 30, or the like. Moreover, an image of the image data may be a moving picture, a still image, or both a moving picture and a still image.

A plurality of routers (70a, 70b, 70c, 70d, 70ab and 70cd) select an optimal path to transmit the image data and voice data. In the following, an arbitrary router of the routers (70a, 70b, 70c, 70d, 70ab and 70cd) is denoted as a "router 70".

The program provision system 90 is equipped with a hard disk (HD) 204, which will be explained later, and stores a program for the terminal, which enables various functions for the terminal 10, or makes the terminal 10 function as various means. The program provision system 90 sends to the terminal 10 the program for the terminal 10.

Moreover, in the HD 204 of the program provision system 90, a program for the relay apparatus, which enables various functions for the relay apparatus 30, or makes the relay apparatus 30 function as various means, is also stored. The program provision system 90 sends to the relay apparatus 30 the program for the relay apparatus 30. Furthermore, in the HD 204 of the program provision system 90, a program for the transmission management, which enables various functions for the management system 50, or makes the management system 50 function as various means, is also stored. The program provision system 90 sends to the management system 50 the program for the transmission management.

The maintenance apparatus 100 is a computer which maintains, manages or maintains at least one of the terminal 10, the relay apparatus 30, the management system 50 and the program provision system 90. For example, assume that the maintenance apparatus 100 is installed in one country and the terminal 10, the relay apparatus 30, the management system 50 or the program provision system 90 is installed out of the country. In this case, the maintenance apparatus 100 performs the maintenance processing of keeping, managing, maintaining, or the like, for at least one of the terminal 10, the relay apparatus 30, the management system 50 and the program provision system 90, remotely via the communication network 2. Moreover, the maintenance apparatus 100 performs maintenance processing of managing a model number, a production number, a sale destination, maintenance and inspection, a failure history or the like, for at least one of the terminal 10, the relay apparatus 30, the management system 50, and the program provision system 90, without using the communication network 2.

The terminals (10aa, 10ab, 10ac, ...), the relay apparatus 30a, and the router 70a are connected via a LAN (local area network) 2a so as to communicate with each other. The terminals (10ba, 10bb, 10bc, ...), the relay apparatus 30b, and the router 70b are connected via a LAN 2b so as to communicate with each other. Moreover, the LAN 2a and the LAN 2b are connected via a dedicated line 2ab including a router 70ab so as to communicate with each other, and built in a predetermined region "A". For example, the region "A" is Japan, and the LAN 2a is built in an office in Tokyo. Moreover, the region "B" is China, and the LAN 2b is built in an office in China.

On the other hand, the terminals (10ca, 10cb, 10cc, ...), the relay apparatus 30c, and the router 70c are connected via a LAN 2c so as to communicate with each other. The terminals (10da, 10db, 10dc, ...), the relay apparatus 30d, and the router 70d are connected via a LAN 2d so as to communicate with each other. Moreover, the LAN 20 and the LAN 2d are connected via a dedicated line 2cd including a router 70cd so as to communicate with each other, and built in a predetermined region "B". For example, the region "C" is the United States of America, and the LAN 2c is built in an office in U.S. Moreover, the region "D" is Europe, and the LAN 2d is built in an office in Europe. The respective routers (70a, 70b, 70c and 70d) are connected via the Internet 2i so as to communicate with each other.

Moreover, the management system 50 and the program provision system 90 are connected to the terminals 10 and the relay apparatuses 30 via the Internet 2i. The management system 50 and the program provision system 90 may be installed in the region "A", in the region "B", in the region "C" or in the region "D", or may be installed outside these regions.

The communication network 2, according to the embodiments, includes the LAN 2a, the LAN 2b, the Internet 2i, the LAN 2c and the LAN 2d. The communication network 2 may include a section where wireless communications, such as Wi-Fi (Wireless Fidelity, registered trademark) or Bluetooth (registered trademark), not only wired communications, are performed.

Moreover, a combination of four integers, indicated below each of the terminals 10, the relay apparatuses 30, the management system 50, the routers 70, and the program provision system 90 in FIG. 1, represents an IP (Internet protocol) address in a simple form of IPv4. For example, the IP address of the terminal 10aa is "1.2.1.3". Moreover, IPv6 may be adopted instead of the IPv4, but the IPv4 is employed for simplicity in the present exemplary embodiment.

Each of the terminals 10 may be used not only for communication between different offices or between different rooms in the same office, but also for communication in the same room, between indoor and outdoor, or both outdoors. In a case where the terminal 10 is used outdoors, public wireless communication, such as using a mobile phone communication network or a public wireless LAN, is performed.

<Hardware Configuration>

Next, a hardware configuration in the embodiments will be described.

(External View of Terminal)

Figure 4:
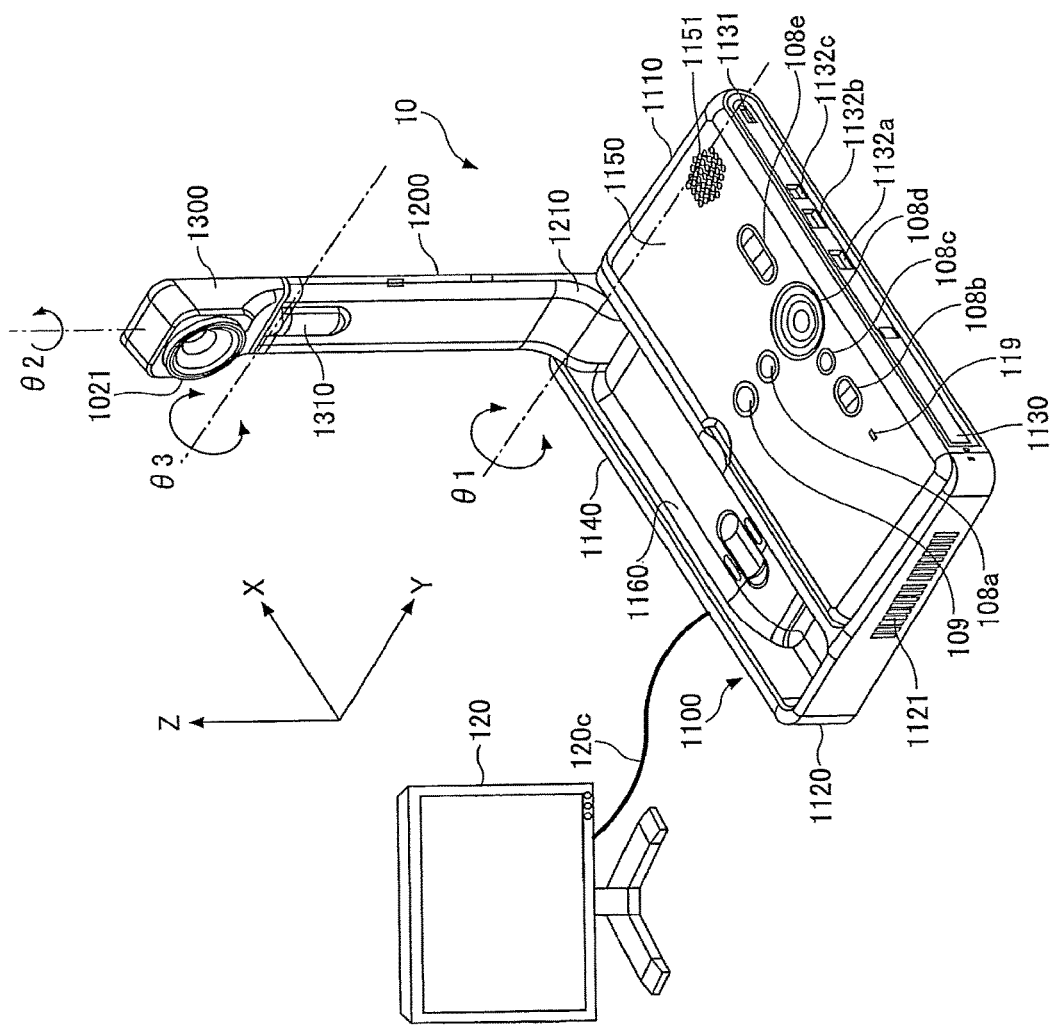
FIG. 4 is an external view illustrating an example of a terminal according to the embodiment.

FIG. 4 is an external view illustrating the terminal 10 according to the embodiments. As illustrated in FIG. 4, the terminal 10 includes a chassis 1100, an arm 1200 and a camera housing 1300. On a front side wall surface 1110 of the chassis 1100, an intake surface (not illustrated) in which a plurality of intake holes are formed is provided, and on a rear side wall surface 1120 of the chassis 1100, an exhaust surface 1121 in which a plurality of exhaust holes are formed is provided. According to the above configuration, by driving a cooling fan embedded in the chassis 1100, outside air in front of the terminal 10 can be taken in via the intake surface provided on the front side wall surface 1110 of the chassis 1100, and exhausted behind of the terminal 10 via the exhaust surface 1121. On a right side wall surface 1130 of the chassis 1100, a sound pickup hole 1131 is formed, and sound such as voice sound, noise or the like can be picked up by a built-in microphone 114, which will be described later.

On the side of the right side wall surface 1130 of the chassis 1100, an operation panel 1150 is formed. The operation panel 1150 is provided with a plurality of operation buttons (108a to 108e), which will be described later, a power switch 109, which will be described later, and an alarm lamp 119, which will be described later. Furthermore, on the operation panel 1150, a sound output surface 1151, in which a plurality of sound output holes are formed for passing output sound from a built-in speaker 115, which will be described later, is formed.

Moreover, on the side of the left side wall surface 1140 of the chassis 1100, there is a storage part 1160, which is a recessed part, for storing the arm 1200 and the camera housing 1300. On the right side wall surface of the chassis 1100, a plurality of connection ports (1132a to 1132c) for connecting electrically a cable to an external device I/F 118, which will be described later, are provided. On the other hand, on a left side wall surface 1140 of the chassis 1100, a connection port (not illustrated) for connecting electrically a cable 120c for the display device 120 to the external device I/F 118, which will be described later, is provided.

In the following, in a case of indicating an arbitrary operation button of the operation buttons (108a to 108e), "operation button 108" is used, and in a case of indicating an arbitrary connection port of the connection ports (1132a to 1132c), "connection port 1132" is used for explanation.

Next, the arm 1200 is mounted on the chassis 1100 via a torque hinge 1210. The arm 1200 is configured so that the arm 1200 is rotatable vertically where a tilt angle $\theta 1$ with respect to the chassis 1100 is within a range of 135 degrees. FIG. 4 illustrates the state where the tilt angle $\theta 1$ is 90 degrees. The camera housing 1300 is provided with a built-in camera 112, which will be described later. The built-in camera images a user, a paper document, a room or the like. Moreover, a torque hinge 1310 is formed on the camera housing 1300. The camera housing 1300 is mounted on the arm 1200 via the torque hinge 1310. The camera housing 1300 is rotatable vertically and horizontally where a pan angle $\theta 2$ with respect to the arm 1200 is within a range of ±180 degrees (FIG. 4 shows the state of 0 degrees), and a tilt angle $\theta 3$ is within a range of ±45 degrees.

The above-described external view of FIG. 4 is an example. The present invention is not limited to this external view. The terminal 10 may be a general-purpose PC, a smartphone, a tablet type terminal or the like. The camera and the microphone are not necessarily built-in type, but may be external types. Moreover, since the management system 50 has the same external view as a typical server computer, an explanation of the external view will be omitted.

(Hardware Configuration of Terminal)

Figure 5:
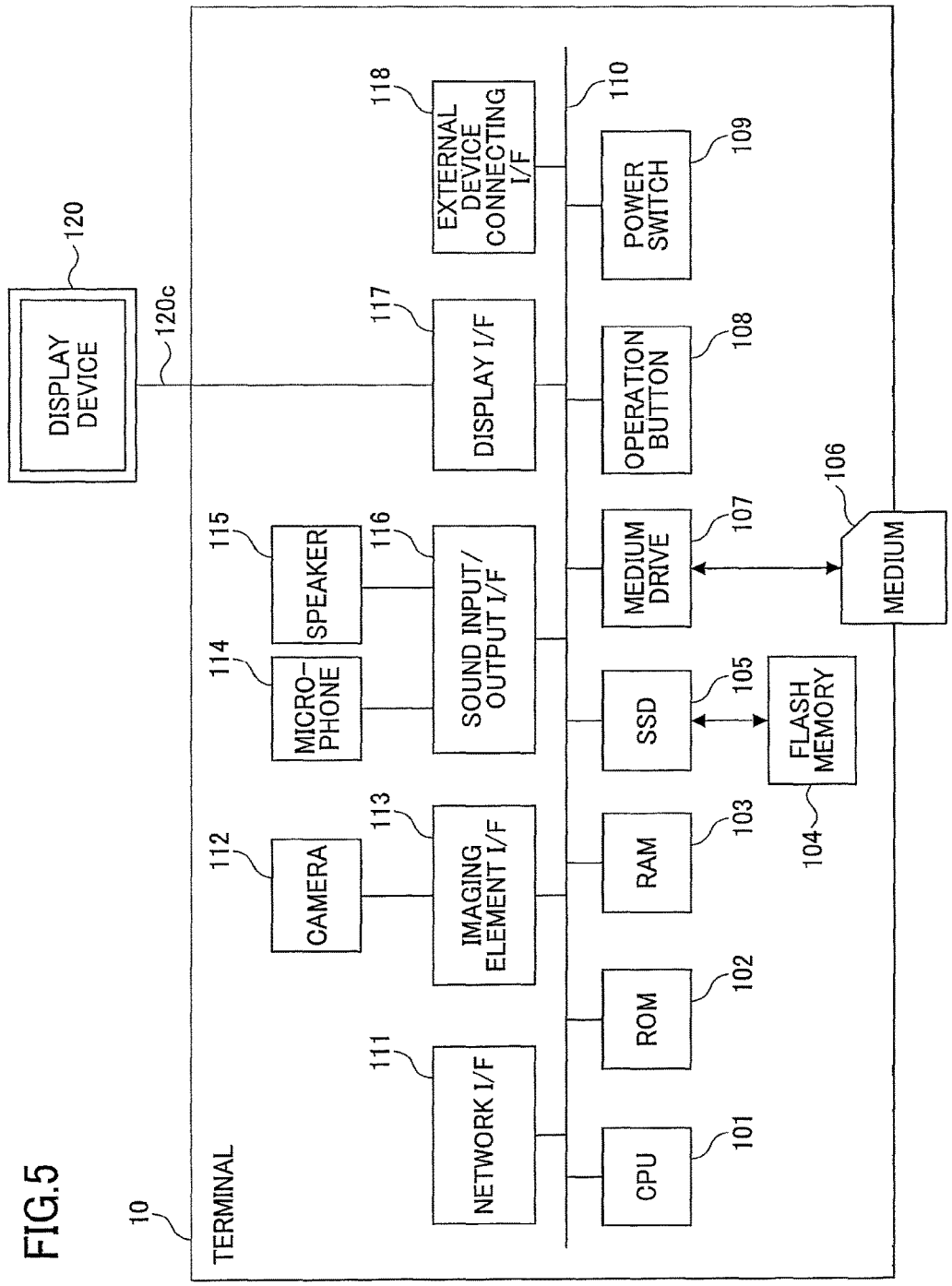
FIG. 5 is a hardware configuration diagram illustrating an example of the terminal according to the embodiment.

FIG. 5 is a diagram illustrating a hardware configuration of the terminal 10 according to the embodiments. The terminal 10 includes configurations of a generic computer, for example, a CPU (central processing unit) 101; a ROM (read-only memory) 102; a RAM (random access memory) 103; a flash memory 104; and an SSD (solid state drive) 105. The terminal 10 further includes a medium drive 107; an operation button 108; a power switch 109; a network I/F (interface) 111; a camera 112; an imaging element I/F 113; a microphone 114; a speaker 115; a sound input/output I/F 116. The terminal 10 further includes a display I/F 117; an external device I/F 118; a bus 110 and the like.

The CPU 101 is, for example, a processing unit that reads out a program or data from the ROM 102, the flash memory 104 or the like and performs a process, to enable respective functions, with which the terminal 10 is provided. The ROM 102 is a non-volatile memory that stores in advance a program or the like used for starting the CPU 101, such as an initial program loader (IPL). The RAM 103 is a volatile memory that is used as a work area or the like for the CPU 101.

The flash memory 104 is, for example, a storage device that stores an operating system (OS), application programs, various types of data and the like. The SSD 105 controls reading/writing various types of data from/to the flash memory 104 under control of the CPU 101. The medium drive 107 controls, for example, reading/writing (storage) data from/to a recording medium 106, such a memory card.

The operation button 108 is an input device that accepts an input operation by a user of the terminal 10. The power switch 109 is a switch for turning ON/OFF a power of the terminal 10. The network I/F 111 is a communication interface for performing data transmission by using the communication network 2.

The camera 112 includes an imaging element for capturing an image of a subject under control of the CPU 101. The imaging element I/F 113 controls capturing by the camera 112 and converts captured data into predetermined image data. The microphone 114 converts picked up sound into an electric signal. The speaker 115 converts a voice signal into voice and outputs the voice. The sound input/output I/F 116 controls input/output of voice by the microphone and the speaker 115.

The display I/F 117 transmits image data to an external display device 120 under the control of the CPU 101. The external device I/F 118 is an interface for connecting various types of external devices. The bus 110 is commonly coupled to the above-described elements, and transmits an address signal, a data signal, various types of control signals, and the like.

The display device 120 includes a liquid crystal display device (LCD), an organic electroluminescence (EL) display device, or the like, and displays an image of a subject, an icon for operation, or the like. Moreover, the display device 120 is coupled to the display I/F 117 by the cable 120c. The cable 120c may be an analog red green blue (RGB) (video graphic array (VGA)) signal cable, or a component video cable.

The camera 112 includes a lens and a solid-state imaging element that converts light into electric charges to digitize an image (video) of a subject. As the solid-state imaging element, for example, a complementary metal-oxide-semiconductor (CMOS) or a charge-coupled device (CCD) is used.

The external device I/F 118 is capable of connecting external devices such as an external camera, an external microphone and an external speaker, respectively, by using a Universal Serial Bus (USB) cable or the like. In a case where an external camera is connected, the external camera is driven in preference to the built-in camera 112 under control of the CPU 101. Similarly, in a case where an external microphone is connected or an external speaker is connected, the external microphone or the external speaker is driven in preference to the built-in microphone 114 or the built-in speaker 115 under control of the CPU 101.

The recording medium 106 is, for example, a recording medium such as various types of memory cards or a subscriber identity module (SIM) card. The recording medium 106 is detachable from the terminal 10.

Furthermore, the above-described program for the terminal 10 may be distributed as a file in an installable form or in an executable form stored in a recording medium readable by a computer such as the recording medium 106. Moreover, the above-described program for the terminal 10 may be, for example, stored in the flash memory 104, preliminarily stored in the ROM 102 or the like.

(Hardware Configuration of Management System)

Figure 6:
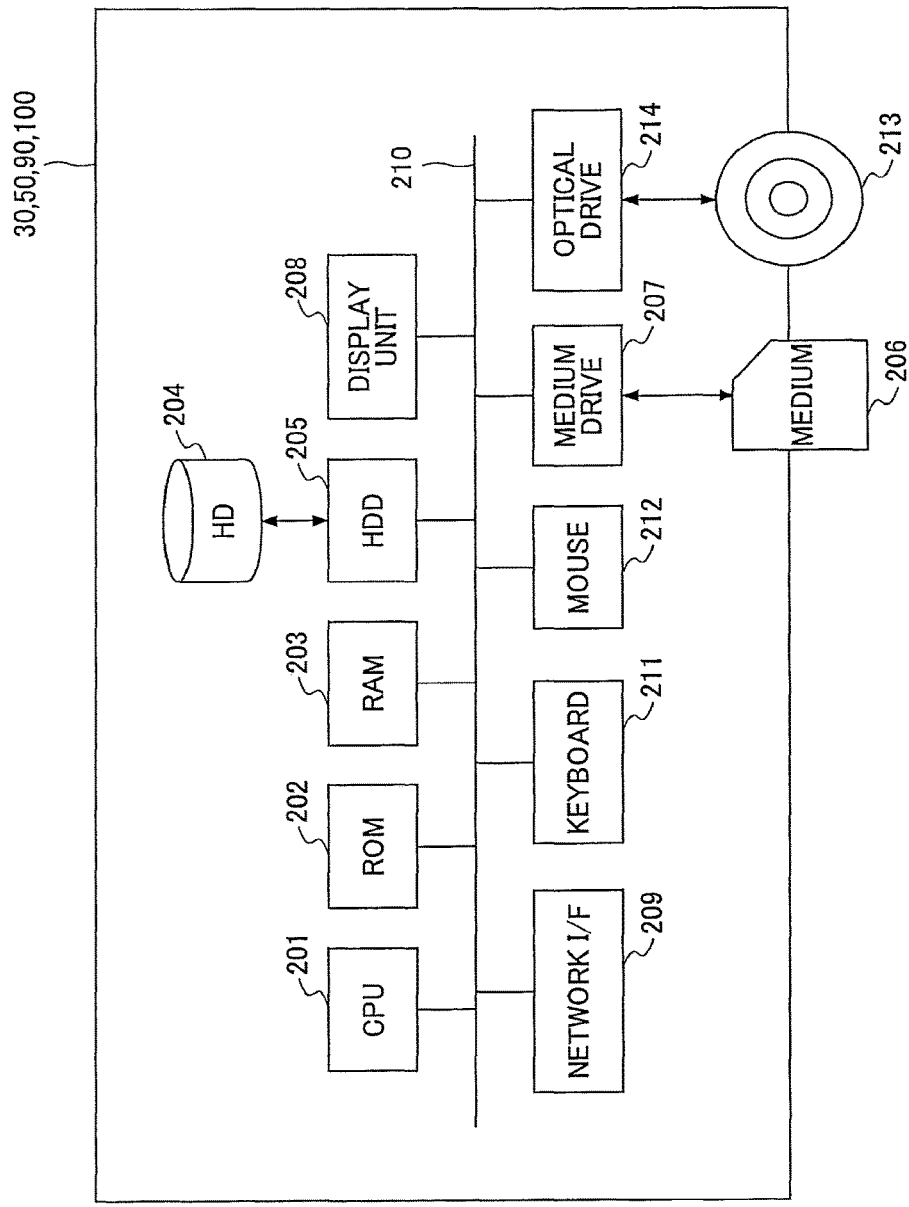
FIG. 6 is a hardware configuration diagram illustrating an example of a management system according to the embodiment.

FIG. 6 is a diagram illustrating a hardware configuration of the management system according to the embodiments. The management system 50 includes elements of a typical computer, for example, a CPU 201; a ROM 202; a RAM 203; an HD 204; a HDD (hard disk drive) 205; a medium drive 207 and a display unit 208. Moreover, the management system 50 includes a network I/F (interface) 209; a keyboard 211; a mouse 212; an optical disk 214, a bus 210 or the like.

The CPU 201 is, for example, a processing unit that reads out a program or data from the ROM 202, the HD 204 or the like and performs a process, to enable respective functions, with which the management system 50 is provided. The ROM 202 is a non-volatile memory that preliminarily stores a program or the like used for starting the CPU 201, such as an IPL. The RAM 203 is a volatile memory that is used as a work area or the like for the CPU 201.

The HD 204 is a storage device that stores programs such as an OS or application programs and various types of data. The HDD 205 controls reading/writing of various types of data from/to the HD 204 under control of the CPU 201. The display unit 208 is a display means for displaying various types of information such as a cursor, a menu, a window, characters or an image.

The network I/F 209 is a communication interface for performing data transmission by using the communication network 2. The keyboard 211 is an example of an input device for accepting a user's input operation for inputting characters, a numerical value, various types of instructions or the like. The mouse 212 is an example of a pointing device for accepting a user's operation of selection or execution of various types of instructions, selection of a process object, movement of a cursor or the like.

The medium drive 207 controls, for example, reading/writing (storage) of data from/to a recording medium 206, such as a memory card. The optical drive 214 controls reading/writing of data from/to various types of optical disks 213, as an example of a detachable recording medium. The bus 210 couples electrically the above-described elements, and transmits an address signal, a data signal, various types of control signals and the like.

The hardware configuration of the above-described computer is an example. For example, the display unit 208, the keyboard 211, the mouse 212 or the like may be provided externally outside the management system 50.

The above-described program for the management system 50 may be distributed as a file in an installable form or in an executable form stored in a recording medium readable by a computer such as the above-described recording medium 206, an optical disk 213 or the like. Moreover, the above-described program for the management system 50 may be, for example, stored in the HD 204, preliminarily stored in the ROM 202 or the like.

Moreover, since the relay apparatus 30 has the same hardware configuration as the above-described management system 50, an explanation will be omitted. However, a program for the relay apparatus for controlling the relay apparatus 30 is stored in the HDD 204. Also in this case, the program for the relay apparatus may be distributed as a file in an installable form or in an executable form stored in a recording medium readable by a computer, such as the recording medium 206, the optical disk 213 or the like. The program for the relay apparatus may be stored in the HD 204, preliminarily stored in the ROM 202 or the like.

Furthermore, since the program provision system 90 and the maintenance apparatus 100 have the same hardware configuration as the management system 50, an explanation will be omitted. However, a program for controlling the program provision system 90 is stored in the HDD 204. Also in this case, the program for the program provision system 90 may be distributed as a file in an installable form or in an executable form stored in a recording medium readable by a computer, such as the recording medium 206, the optical disk 213 or the like. The program for the program provision system 90 may be stored in the HDD, preliminarily stored in the ROM 202 or the like.

Next, a functional configuration of the transmission system 1 will be described.

<Functional Configuration>

Figure 7:
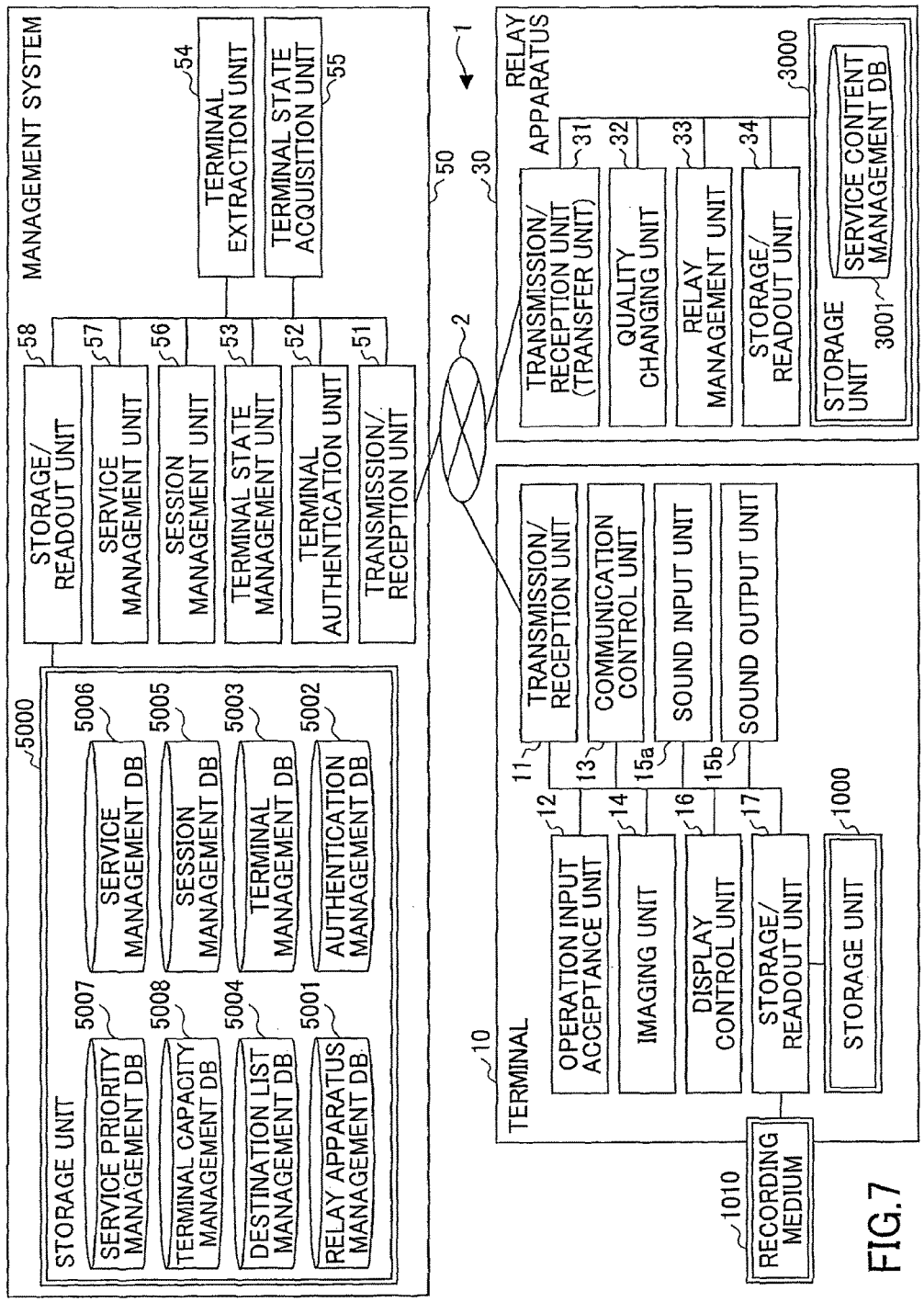
FIG. 7 is a functional configuration diagram illustrating an example of a transmission system according to the embodiment.

FIG. 7 is a functional configuration diagram illustrating a transmission system according to the embodiment. In FIG. 7, the transmission system 1 includes the terminal 10, the relay apparatus 30 and the management system 50, which are connected so as to perform data communications via the communication network 2. Moreover, the program provision system 90, illustrated in FIG. 1, is not relevant to the communication for the video conference directly, and is omitted in FIG. 7.

(Functional Configuration of Terminal)

The terminal 10 includes a transmission/reception unit 11; an operation input acceptance unit 12; a communication control unit 13; an imaging unit 14, a sound input unit 15a, a sound output unit 15b, a display control unit 16, and a storage/readout unit 17. Each of the above units is a function or a functioning means enabled by any of the respective components, illustrated in FIG. 5, operating according to an instruction from the CPU 101 following the program for the terminal 10, which has been copied from the flash memory 104 onto the RAM 103. Moreover, the terminal 10 includes a storage unit 1000, enabled by the RAM 103 illustrated in FIG. 5 and the flash memory 104 illustrated in FIG. 5. Furthermore, in the terminal 10, a recording medium 1010 enabled by the recording medium 106, illustrated in FIG. 5, is inserted, and reading or writing various types of data is performed by the storage/readout unit 17.

(Functional Configuration of Terminal)

Next, the functional configuration of the terminal 10 will be explained in detail. In the following, in the explanation of the respective functions of the terminal 10, a relationship with the main component, which enables the respective functions of the terminal 10, among the respective components illustrated in FIG. 5, also will be described.

The transmission/reception unit 11 is enabled by the instruction from the CPU 101 illustrated in FIG. 5 and the network I/F 111, illustrated in FIG. 5, and sends various data (or information) to and receives various data (or information) from other terminals, other apparatuses, or other systems, via the communication network 2. The transmission/reception unit 11 starts receiving before starting communicating with an intended destination terminal, status information indicating a status of each of the terminals as candidates of destination, from the management system 50. The status information indicates not only operating status (online state or offline state) of each of the terminals 10, but also detailed information, such as, in the online state, whether calling is possible, whether it is busy, whether a user is leaving her/his seat, or the like. In the following, an example where the status information indicates the operational status will be described.

The operation input reception unit 12 is enabled by the instruction from the CPU 101 illustrated in FIG. 5, the operation button 108 and the power switch 109, illustrated in FIG. 5, and accepts various inputs from a user. For example, when the user turns the power switch 109 illustrated in FIG. 5 to "ON", the operation input acceptance unit 12 accepts a signal of the user's operation, and turns on the power.

The communication control unit 13 is enabled by the instruction from the CPU illustrated in FIG. 5. The communication control unit 13, for example, at a timing of accepting the above-described power ON, from the transmission/reception unit 11 to the management system 50 via the communication network 2, automatically sends login request information indicating requiring login and an IP address of the request source terminal at present. Moreover, when the user turns the power switch from ON state to OFF, after the transmission/reception unit 11 sends status information indicating turning the power OFF to the management system 50, the operation input acceptance unit 12 turns the power OFF. Accordingly, the side of the management system 50 can perceive that the power of the terminal 10 is turned from ON to OFF.

Moreover, the communication control unit 13 performs various communication controls, such as establishing, cutting off or the like a communication session sending/receiving content data to/from the other terminal 10 via the relay apparatus 30. The communication control unit 13 according to the embodiment sends control information for a session (e.g. start request information or start response information, which will be described later) to be sent to the management system 50 including an service ID and terminal capacity information of the terminal 10. The service ID is an example of service identification information for identifying service content to be provided to each of the terminals 10. Moreover, the terminal capacity information is information indicating service content that the terminal 10 can use (available for the terminal 10).

The imaging unit 14 is enabled by the instruction from the CPU 101 illustrated in FIG. 5, the camera 112 and the imaging element I/F 113, illustrated in FIG. 5, and outputs image data of an object obtained by capturing a subject and converting captured data into predetermined image (video) data.

The sound input unit 15a is enabled by the instruction from the CPU 101 illustrated in FIG. 5 and the sound input/output I/F 116, illustrated in FIG. 5, and outputs predetermined voice data obtained by converting voice of a user into an electric signal at the microphone 114. The sound output unit 15*b* is enabled by the instruction from the CPU 101 illustrated in FIG. 5 and the sound input/output I/F 116, illustrated in FIG. 5, and outputs a voice signal, obtained by converting the voice data, to the speaker 115, then sound is output from the speaker 115.

The display control unit 16 is enabled by the instruction from the CPU 101 illustrated in FIG. 5 and the display I/F 117, illustrated in FIG. 3. Moreover, the display control device 16 controls, as described later, controls for combining received image data, resolutions of which are different from each other, and sending the combined image data to the display device 120. Moreover, the display control unit 16 may send to the display device 120 information on a destination list received from the management system 50, and display the destination list on the display device 120.

The storage/readout process unit 17 is enabled by the instruction from the CPU 101 illustrated in FIG. 5 and the SSD 105, illustrated in FIG. 5, or the storage/readout process unit 17 is enabled by the instruction from the CPU 101. The storage/readout unit 17 stores various data into the storage unit 1000, and reads out various data stored in the storage unit 1000. The storage unit 1000 stores a terminal ID (identification) for identifying the terminal 10, a password, terminal capacity information and the like. Furthermore, the storage unit 1000 stores image data and voice data received in the communication with the destination terminal, while overwriting the previously stored data. Image data in the previously stored data, to be overwritten, are converted and output from the display device 120 as images, and voice data in the previously stored data are converted and output from the speaker 115 as voice sound.

Moreover, the storage/readout unit 17 reads out a service ID from a recording medium 1010 which stores the service ID (service identification information) for identifying a service to be provided to the terminal 10. The recording medium 1010 storing the service ID may be, for example, a rewritable recording medium such as a memory card or may be, for example, a recording medium such as a SIM card in which contract information or the like for the user is recorded.

Moreover, in a case where the recording medium 1010 is a SIM card, the service ID may be SIM identification information or the like regarding the contract information for the user, or may be information regarding service content which is stored separately from the SIM identification information.

Moreover, the terminal 10 may use the SIM identification information stored in the recording medium 1010 as a terminal ID or the like, instead of the terminal ID stored in the storage unit 1000.

The terminal ID according to the embodiment, a relay apparatus ID, and a service ID, which will be explained later, indicate an example of identification information, such as a language, a character, a symbol, various signs, or the like, used for uniquely identifying a terminal 10, a relay apparatus 30 and service content, respectively. Moreover, the terminal ID, the relay apparatus ID and the service ID may be identification information of a combination of at least two of the above-described language, the character, the symbol and the various signs.

Moreover, instead of the terminal ID, a user ID for identifying the user of the terminal 10 may be used. In this case, the terminal identification information includes not only the terminal ID but also the user ID.

(Functional Configuration of Management System)

The management system 50 includes a transmission/reception unit 51, a terminal authentication unit 52, a terminal state management unit 53, a terminal extraction unit 54, a terminal state acquisition unit 55, a session management unit 56, a service management unit 57, a storage/readout unit 58 and the like. Each of the above units is a function or means enabled by one of the components, illustrated in FIG. 6, operating according to an instruction from the CPU 201 following the program for the management system 50, which has been copied from the HD 204 onto the RAM 203. Moreover, the management system 50 includes a storage unit 5000, enabled by the HD 204 or the like, illustrated in FIG. 6.

(Functional Elements in Management System)

Next, each functional element in the management system 50 will be explained in detail. In the following, in the explanation of the functional elements of the management system 50, a relationship with the main component, which enables the respective functional elements of the management system 50, among the respective components illustrated in FIG. 6, also will be described.

The transmission/reception unit 51 is executed by an instruction from the CPU 201 illustrated in FIG. 6 and the network I/F 209, illustrated in FIG. 6, and sends various data (information) to and receives various data (information) from another terminal, another apparatus or another system via the communication network 2.

The terminal authentication unit 52 is enabled by the instruction from the CPU 201 illustrated in FIG. 6. The terminal authentication unit 52 determines, for example, whether a combination of terminal ID and a password included in login request information received by the transmission/reception unit 51 is included in the authentication management DB (Database) 5002, to perform authentication of the terminal 10.

The terminal state management unit 53 is enabled by the instruction from the CPU 201 illustrated in FIG. 6, and manages the operational status of the request source terminal, which requires a login. The terminal state management unit 53 stores in the terminal management DB 5003 a destination name, an operational status, reception date and time of request information or the like, an IP address of the request source terminal and the like, for each terminal ID, by associating them with each other, to manage them. Moreover, the terminal state management unit 53 changes the operational state indicating "ONLINE" in the terminal management DB 5003 to "OFFLINE", based on status information indicating turning the power OFF, sent from the terminal 10, when the user turns a state of the power switch 109 of the terminal 10 from "ON" to "OFF". The terminal management DB 5003 will be described later.

The terminal extraction unit 54 is enabled by the instruction from the CPU 201 illustrated in FIG. 6. The terminal extraction unit 54 extracts a terminal ID by searching the destination list management DB 5004 with the terminal ID of the request source terminal, which requires a login, as a search key and reads out a terminal ID of a destination terminal which can communicate with the request source terminal. Moreover, the terminal extraction unit 54 searches the destination list management DB 5004 with the terminal ID of the request source terminal, which requires a login, as a search key, and also extracts terminal IDS of other request source terminals, for each of which the terminal ID of the above request source terminal is registered as a candidate of a destination terminal.

The terminal state acquisition unit 55 is enabled by the instruction from the CPU 201 illustrated in FIG. 6. The terminal state acquisition unit 55 searches the terminal management DB 5003, with the terminal ID of the candidate of the destination terminal extracted by the terminal extraction unit 54, as a search key, and reads out the operating status for each of the terminal IDs extracted by the terminal extraction unit 54. Accordingly, the terminal state acquisition unit 55 can acquire operating status of candidates of the destination terminal, which are allowed to communicate with the request source terminal, which has required the login. Moreover, the terminal state acquisition unit 55 searches the terminal management DB 5003, with the terminal ID extracted by the terminal extraction unit 54 as a search key, and also acquires the operational status of the request source terminal, which has required the login. The destination list management DB 5004 will be described later.

Figure 8:
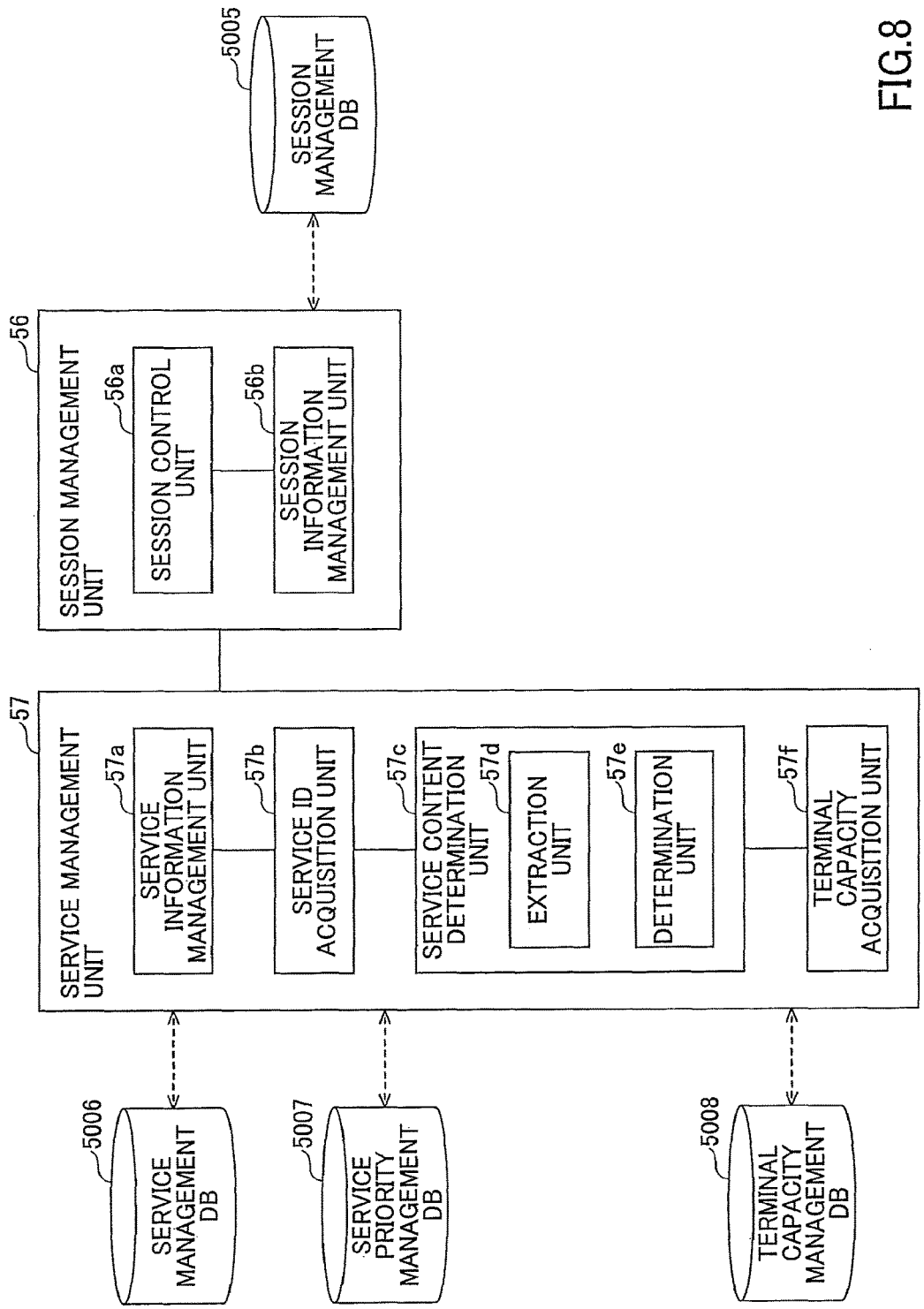
FIG. 8 is a configuration diagram illustrating an example of a service management unit and a session management unit according to the embodiment.

The session management unit 56 is enabled by the instruction from the CPU 201 illustrated in FIG. 6, and includes, for example, a session control unit 56a and a session information management unit 56b, as illustrated in FIG. 8.

FIG. 8 is a functional configuration diagram illustrating an example of a service management unit and a session management unit according to the embodiment.

In FIG. 8, the session control unit 56a performs a control of a session managed by the management system 50, such as a session of a remote conference or content distribution. The control of session includes, for example, control for establishing a session, control for causing a terminal 10 to participate in the established session, control for cutting off the session, control for generating a session ID or the like.

The session information management unit 56b stores a request source terminal ID of the terminal 10, which requires to start the session, a destination terminal ID of the destination terminal 10 and the like in the session management DB 5005 in association with the session ID generated by the session control unit 56a, to manage them. The session management DB 5005 will be described later.

The service management unit 57 illustrated in FIG. 7 is enabled by the instruction from the CPU 201 illustrated in FIG. 6, and includes, for example, a service information management unit 57a, a service ID acquisition unit 57b and a service content determination unit 57c, a terminal capacity acquisition unit 57f, and the like, as illustrated in FIG. 8.

In FIG. 8, the service information management unit (service management means) 57a stores, in the service management DB 5006, a service ID for identifying service content provided to each of the terminals 10 and service content corresponding to each service ID, to manage them.

The service content of the terminal 10 includes, for example, information indicating a quality of content data that the terminal 10 sends (transmission quality), information indicating a quality of content data that the terminal 10 receives (reception quality), or the like.

The service information management unit 57a stores in the service management DB 5006, for example, a service ID and service content corresponding to the service ID in association with each other, in response to an operation by an administrator of the management system 50, request information from another information processing apparatus or the like. The service management DB 5006 will be described later.

The service ID acquisition unit (first acquisition means) 57b acquires a service ID of each of the terminals 10 participating in the session. For example, the service ID acquisition unit 57b acquires a message such as start request information received from each of the terminals 10 participating in the session or start response information from the session management unit 56a, and acquires (extracts) a service ID included in the acquired information.

Moreover, as another example, the service ID acquisition unit 57b may acquire identification information (terminal ID) of the terminal 10 from information received from each of the terminals 10, to acquire a service ID from a database or the like which preliminarily stores a terminal ID and a service ID in association with each other.

The terminal capacity acquisition unit (second acquisition means) 57f acquires terminal capacity information indicating service content of each of the terminals 10 participating in a session that the respective terminals 10 can use (available for the respective terminals 10). For example, the terminal capacity acquisition unit 57f acquires, from the session control unit 56a, a message of start request information received from the respective terminals participating in the session, start response information or the like, and acquires (extracts) terminal capacity information included in the acquired information.

Preferably, the terminal capacity acquisition unit 57f stores the acquired terminal capacity information of each terminal 10 in th terminal capacity management DB 5008 to manage. The terminal capacity management DB 5008 will be described later.

Moreover, as another example, the terminal capacity acquisition unit 57f may acquire a terminal ID of a terminal 10 included in information received from each terminal 10, and acquire a service ID from a database or the like that stores in advance a terminal ID and terminal capacity information of each terminal 10 in association with each other.

The configuration of the service management unit 57, illustrated in FIG. 8, is an example. The service ID acquisition unit 57b and the terminal capacity acquisition unit 57f may be the same acquisition unit (a single acquisition unit).

The service content determination unit 57c determines service content of each terminal 10, based on service IDs of the terminals 10 acquired by the service ID acquisition unit 57b, and terminal capacity information of the terminals acquired by the terminal capacity acquisition unit 57f. The service content determination unit 57c includes, for example, an extraction unit 57d and a determination unit 57e, as illustrated in FIG. 8.

The extraction unit 57d extracts service content that each terminal 10 can use (available for each terminal 10) based on service content corresponding to the service ID of each terminal 10 acquired by the service ID acquisition unit 57b and service content corresponding to terminal capacity information of each terminal ID acquired by the terminal capacity acquisition unit 57f.

Preferably, the extraction unit 57d extracts the service content of the terminal 10 participating in a session so as to fulfill service content corresponding to service identification information of the terminal 10, and fulfill service content corresponding to terminal capacity information of the terminal 10.

Furthermore, the extraction unit 57d extracts the service content of each terminal 10 so that a quality of content data sent by the terminal 10 is more than or equal to a quality of content data received by the other terminal 10 participating in the session. Moreover, the extraction unit 57d extracts the service content of each terminal 10 so that a quality of content data received by the terminal 10 less than or equal to a quality of content data sent by the other terminal 10 participating in the session.

This is because, as described later, in the embodiment, the terminal 10 sends content data to the relay apparatus 30 and the relay apparatus 30 converts the content data received from the terminal 10 into a quality depending on the other terminal 10 participating in the session to deliver. In general, when image data of low image quality is converted into high image quality, degradation of image quality is involved, and a load of processing becomes greater. Accordingly, in the embodiment, the service content of the terminal 10 is extracted so that the quality conversion by the relay apparatus 30 is performed without changing the quality or with reducing the quality.

The determination unit 57e determines service content of each terminal 10 participating in the session, based on the service content of each terminal 10 extracted by the extraction unit 57d. For example, when there are a plurality of service contents of the terminal 10 extracted by the extraction unit 57d, the determination unit 57e determines the service content of the terminal 10 among the plurality of extracted service contents.

Preferably, the determination unit 57e determines the service content of each terminal 10 based on a service priority management DB (service priority information) 5007 that stores preliminarily prioritized quality content for each service ID. The service priority management DB 5007 will be described later.

Preferably, the quality of the above-described content data includes quality items of a frame rate of image data, a bit rate, resolution, image quality, color depth or the like. Moreover, preferably, the quality of content data includes quality items of a sampling rate of sound (voice) data, a bit rate, a quantized bit number or the like.

Returning to FIG. 7, description of the functional configuration of the management system 50 continues.

The storage/readout unit 58 of the management system 50 is enabled by the instruction from the CPU 201 illustrated in FIG. 6 and the HDD 205, or enabled by the instruction from the CPU 201. The storage/readout unit 58 stores various types of data to the storage unit 5000, and reads out various data from the storage unit 5000. Moreover, the storage/readout unit 58 may store various types of data in an external device (for example, a storage server) coupled via a communication network 2 or the like.

<Functional Configuration of Relay Apparatus>

The relay apparatus 30 includes a transmission/reception unit (transfer unit) 31, a quality changing unit 32, a relay management unit 33 and a storage/readout unit 34. Each of the above units is a function or means enabled by one of the components, illustrated in FIG. 6, operating according to an instruction from the CPU 201 following the program for the relay apparatus, which has been copied from the HD 204 onto the RAM 203. Moreover, the relay apparatus 30 includes a storage unit 3000, comprising the RAM 203 illustrated in FIG. 6 and/or the HD 204 illustrated in FIG. 6.

(Functional Configuration in the Relay Apparatus)

Next, the functional configuration of the relay apparatus 30 will be described. In the following, in the explanation of the functional configuration of the relay apparatus 30, a relationship with the main component, which enables the respective functions of the relay apparatus 30, among the respective components illustrated in FIG. 6, also will be described.

The transmission/reception unit (transfer unit) 31 is enabled by the instruction from the CPU 201 illustrated in FIG. 6 and the network I/F 209 illustrated in FIG. 6, and sends various data (information) to and receives various data (information) from another terminal, another apparatus or another system via the communication network 2. Moreover, the transmission/reception unit 31 also plays a role of a transfer unit, and transfers (relays) content data (image data, sound data or the like) received from the terminal 10 participating in the session to another terminal 10 participating in the session following an instruction from the relay management unit 33.

The quality changing unit 32 is enabled by the instruction from the CPU 201 illustrated in FIG. 6. The quality changing unit 32 changes (converts) a quality of the content data transferred by the transmission/reception unit 31 following the instruction from the relay management unit 33.

The relay management unit 33 is enabled by the instruction from the CPU 201 illustrated in FIG. 6, and includes, for example, a service content management unit 33a, a quality setting unit 33b and a relay control unit 33c.

Figure 9:
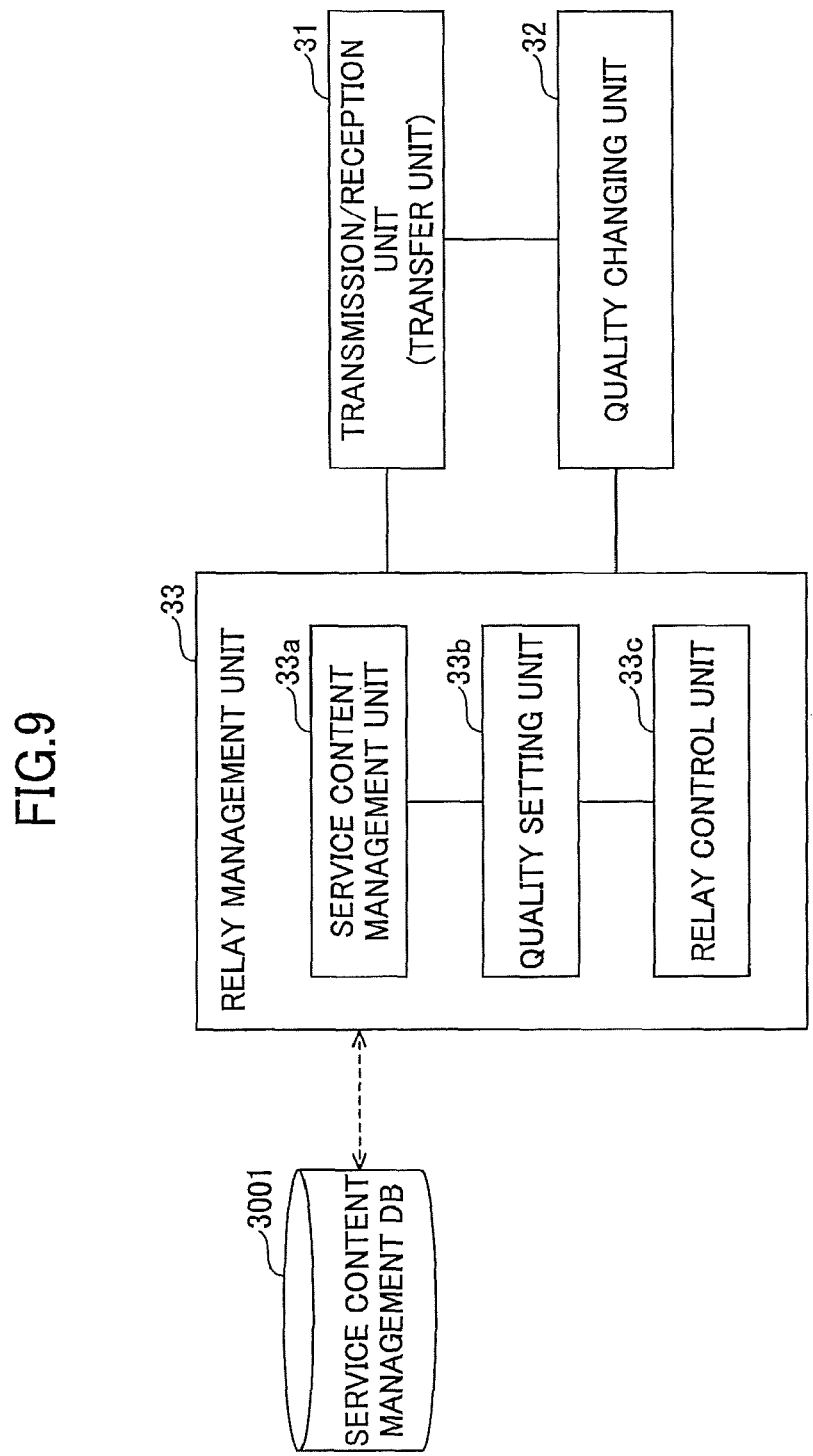
FIG. 9 is a configuration diagram illustrating an example of a relay management unit according to the embodiment.

FIG. 9 is a functional configuration diagram depicting a relay management unit according to the embodiment.

The service content management unit 33a stores, in the service content management DB 3001, session information received from the management system 50 via the transmission/reception unit 31, to manage it. The service content management DB 3001 will be described later.

The quality setting unit 33b sets content of conversion (change) for communication quality in the quality changing unit 32, based on the session information stored in the service content management DB 3001, when the session starts.

The relay control unit 33c controls a transfer (relay) process for content data by the transmission/reception unit (transfer unit) 31. For example, the relay control unit 33c sends the transfer destination or the like of content data received from each of the terminals 10 participating in the session to the transmission/reception unit (transfer unit) 31.

According to the above-described configuration, the quality changing unit 32 in the relay apparatus 30, based on the session information managed in the service content management unit 33a, changes the quality of content data transferred at the transmission/reception unit (transfer unit) 31, and sends them to the designated transfer destination.

The relay apparatus 30 according to the embodiment receives content data sent from the terminal 10 participating in the session, converts the received content data into a reception quality of the other terminal 10 participating in the session, and transfers the converted data. At this time, relay apparatus 30 may transfer the content data without converting the quality of the content data when a quality of content data of a transfer destination is the same as a quality of content data received from a transfer source.

The storage/readout unit 34 is enabled by the instruction from the CPU 201 illustrated in FIG. 6 and the HDD 205, and performs processing of storing various data in the storage unit 3000, and reading out various data stored in the storage unit 3000.

<Example of Information Managed by Management System>

Here, the management databases (DBs) stored in the storage unit 5000 of the management system 50 will be described.

FIGS. 10A to 10C are conceptual diagrams depicting the relay apparatus management table, the authentication management table and the terminal management table according to the embodiment.

(Relay Apparatus Management Table)

The relay apparatus management DB 5001 stored in the storage unit 5000 of the management system 50 includes, for example, a relay apparatus management table 1001 as illustrated in FIG. 10A. In the relay apparatus management table 1000, for each relay apparatus ID of the relay apparatuses 30, the operating state of the relay apparatus 30, the reception date/time of the operating state, the IP address of the relay apparatus 30, the maximum data transfer rate (Mbps) of the relay apparatus 30 and the like are stored in association with one another. For example, the relay apparatus management table 1001 illustrated in FIG. 10A indicates that the relay apparatus 30a with the relay apparatus ID "111a" has the operating state "online". Moreover, the relay apparatus management table 1001 shows that the reception date/time of the operating state at the management system 50 is "Apr. 10, 20xx, 10:00". Moreover, the relay apparatus management table 1001 also indicates that the IP address of the relay apparatus 30a is "1.2.1.2" and the maximum data transfer rate in the relay apparatus 30a is "100 Mbps".

(Authentication Management Table)

Moreover, the authentication management DB 5002 stored in the storage unit 5000 of the management system 50 includes, for example, an authentication management table 1002 as illustrated in FIG. 10B. In the authentication management table 1002, each terminal ID of the terminal 10 managed by the management system 50 and a password of each the terminal 10 are stored and managed in association with each other. For example, the authentication management table 1002, illustrated in FIG. 10B, indicates that the terminal ID of the terminal 10 is "01aa", and the password of the terminal 10 is "aaaa".

(Terminal Management Table)

Furthermore, a terminal management DB 5003 stored in the storage unit 5000 of the management system 50 includes, for example, a terminal management table 1003 as illustrated in FIG. 10C. In the terminal management table 1003, for each terminal ID of the terminal 10, a destination terminal name in the case where the terminal 10 serves as a destination terminal, the operating state of the terminal 10, a date/time received at which login request information described later is received by the management system 50, and the IP address of the terminal 10 are stored in association with one another. For example, the terminal management table 1003 illustrated in FIG. 10C indicates that the terminal 10 with the terminal ID "01aa" has the destination terminal name "AA terminal, Tokyo office, Japan", the operating state "online (communication OK)", the date/time received at which login request information is received by the management system 50 "Apr. 10, 20xx, 13:40", and the IP address "1.2.1.3".

FIGS. 11A and 11B are conceptual diagrams depicting the destination list management table and the session management table according to the embodiment.

(Destination List Management Table)

A destination list management DB 5004 stored in the storage unit 5000 of the management system 50 includes, for example, a destination list management table 1101 as illustrated in FIG. 11A. In the destination list management table 1101, all destination terminal IDs that are terminal IDs of destination terminals 10 registered as candidate destination terminals are stored in association with a request source terminal ID that is a terminal ID of a request source terminal that sends a request to start communication (transmission) in a video conference. For example, the destination list management table 1101 illustrated in FIG. 11A indicates that candidates for a destination terminal to which a request source terminal with a terminal ID "01ab" can send a request to start communication in a video conference are the terminal with a terminal ID "01aa", the terminal with a terminal ID "01ba" and the terminal with a terminal ID "01bb". The candidate destination terminals are updated by addition or deletion in response to an addition or deletion request received from an arbitrary request source terminal to the management system 50.

(Session Management Table)

A session management DB 5005 stored in the storage unit 5000 of the management system 50 includes a session management table 1102 as illustrated in FIG. 11B. The session management table 1102 manages, for each session ID, which is identification information of a session, a relay apparatus ID of a relay apparatus 30 which is used for relaying, a terminal ID of a request source terminal, a terminal ID of a destination terminal, a delay time (ms), a reception date/time of the delay time and the like.

(Service Management Table)

FIG. 12 is a conceptual diagram depicting the service management table according to the embodiment.

A service management DB 5006 stored in the storage unit 5000 of the management system 50 includes, for example, a service management table 1201 as illustrated in FIG. 12. In the service management table 1201 for each service ID, service contents such as an image quality parameter, a sound quality parameter and the like are stored in association with each other.

The service ID is an example of service identification information for identifying service content provided to each of the terminals 10 (or users of the terminals 10) managed by the management system 50.

The image quality parameter and the sound quality parameter are information included in the service content provided to the terminal 10 or to the users of the terminals 10, and are an example of information specifying quality of content data of the session.

The image quality parameter includes, for example, a frame rate, a bit rate, image quality, resolution, color depth or the like. In the example illustrated in FIG. 12, the image quality parameter includes a frame rate and reception image quality. The frame rate represents a number of frames of image processed in a unit time and expressed in a unit of fps (frame per second), for example. Moreover, the reception image quality is indicated by low-resolution, intermediate-resolution and high-resolution, described in FIGS. 3A to 3C.

The greater a value of the frame rate, i.e. value of fps is, more fluid a motion of an image (motion picture) is. However, an amount of transmitted data becomes greater. Moreover, a reception image quality of the intermediate-resolution is higher than that of the low-resolution. But, an amount of transmitted data becomes greater. Therefore, in a case where an available communication bandwidth is restricted, when priority is given to image quality to select the intermediate-resolution, the frame rate may be reduced. In contrast, when priority is given to a motion to increase the value of fps, the image quality may decrease.

In contrast, an example of the sound quality parameter includes a sampling rate, a bit rate, quantized bit number of the like. In the example illustrated in FIG. 12, the sound quality parameter includes a sampling rate. The sampling rate represents a number of samples of voice (sound) per unit time, and expressed by, for example, a sampling frequency. The higher the sampling frequency is, the better the sound quality is.

Information that specifies communication quality included in the service content may include information indicating coding system or the like. For example, in a case where in the terminal 10 a plurality of coding systems (H.264/AVC, H.264/SVC, H.265 and the like) are available for processing images, the information including service content in the service management table 1103 may be information for specifying the coding system or the like.

Content of the service management table 1103 is assumed to be information which is preliminarily set by the administrator of the management system 50, a provider of service or the like.

FIG. 13 is a conceptual diagram depicting the terminal capacity management table according to the embodiment. In the terminal capacity management DB 5008 stored in the storage unit 5000 of the management system 50 includes, for example, the terminal capacity management table 1301, as illustrated in FIG. 13. In the terminal capacity management table 1301, a terminal ID that is identification information for identifying a terminal 10 and terminal capacity information indicating terminal capacity of the terminal 10 are managed in association with each other.

Information indicating the terminal capacity of the terminal 10 includes, for example, information indicating a quality of content data that the terminal 10 can send, information indicating a quality of content data that the terminal 10 can receive, or the like. For example, in FIG. 13, the terminal capacity on the reception side of the terminal 10 with terminal ID "01aa" indicates that image data with a reception frame rate of "30 fps" or "20 fps" and the reception image quality of "low-resolution" can be received. Similarly, the terminal capacity on the transmission side of the terminal 10 with terminal ID "01aa" indicates that image data with a transmission frame rate of "40 fps" or "20 fps" and the transmission image quality of "intermediate-resolution" can be sent.

The information indicating the terminal capacity is updated, for example, when an external camera (e.g. a USB camera) is installed on the terminal 10. Moreover, in the transmission system 1 that uses SIM identification information stored in the recording medium 1010 as a terminal ID, the information indicating the terminal capacity is updated when the recording medium 1010 storing the SIM identification information is attached to another terminal or the like.

The terminal capacity acquisition unit 57f of the management system 50 acquires, for example, information indicating terminal capacity included in start request information received from a terminal participating in a session, start response information or the like, and stores the acquired terminal capacity in the terminal capacity management table 1301.

Moreover, as another example, the management system 50 may preliminarily store the terminal capacity management table 1301 in the terminal capacity management DB 5008. In this case, a terminal capacity acquisition unit 571 becomes able to acquire terminal capacity from the terminal capacity management table 1301 by using a terminal ID included in the start request information received from the terminal 10 participating in the session, the start response information or the like.

(Service Priority Management Table)

FIG. 14 is a conceptual diagram depicting the service priority management table according to the embodiment.

A service priority management DB (service priority information) 5007 stored in the storage unit 5000 of the management system 50 includes, for example, a service priority management table 1401, as illustrated in FIG. 14. In the service priority management table 1401, in association with each service ID, information indicating prioritized quality content for each quality item of communication quality is stored. FIG. 14 indicates, for example, that when there are a plurality of options of a transmission frame rate, a service ID "sv901" preferentially selects a higher frame rate. Similarly, for the other quality items, prioritized contents of quality are illustrated.

When there are a plurality of service contents extracted by the extraction unit 57d, the determination unit 57e of the management system 50, narrows down (determines) to service content of one session using the service priority management DB 5007, for example.

<Example of Information Managed by Relay Apparatus>
(Service Content Management DB)

FIG. 15 is a conceptual diagram illustrating the service content management table according to the embodiment. A service content management DB 3001 stored in the storage unit 3000 of the relay apparatus 30 includes, for example, a service content management table 1501 as illustrated in FIG. 15. The service content management table 1501 stores service content for each session reported from the management system 50, in association with a session ID that is identification information of each session.

The service content stores, for example, as illustrated in FIG. 15, a terminal ID which is identification information of terminals 10, and service contents for the respective terminal IDs (e.g. reception frame rate, transmission frame rate or the like).

<Flow of Process>

Next, a flow of a process in the transmission system 1 will be described with reference to a sequence diagram.

(Process at Preparation Stage)

Figure 16:
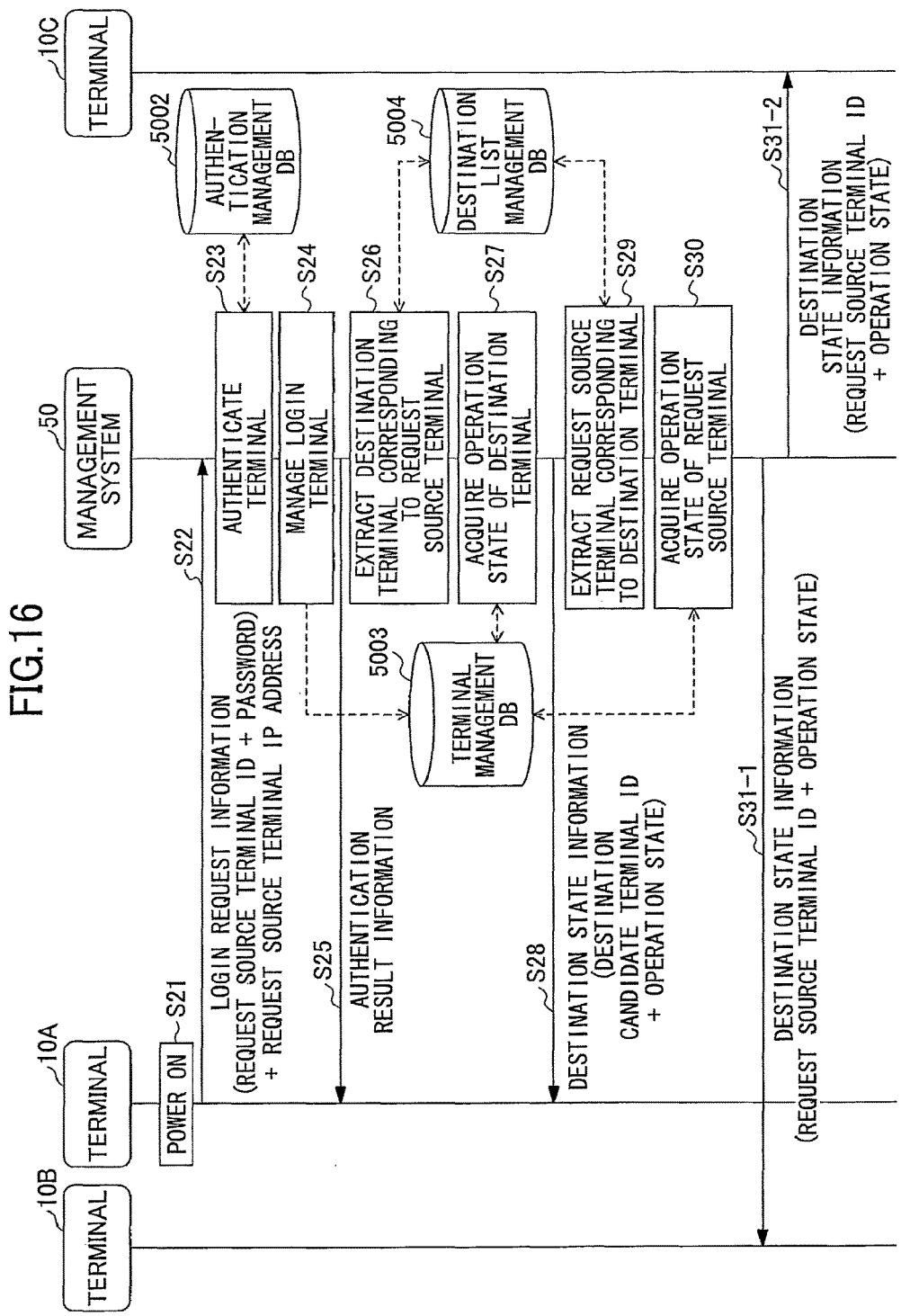
FIG. 16 is a sequence diagram illustrating an example of an operation in a preparation stage for the transmission system according to the embodiment.

FIG. 16 is a sequence diagram illustrating an example of a process in a preparation stage for the transmission system according to the embodiment. In the following, as an example, a process in a preparation stage before starting the session by a terminal 10A, a terminal 10B and a terminal 10C will be described. In the following explanation, terminal IDs of the terminals 10A, 10B and 10C are assumed to be "01aa", "01ba" and "10db", respectively. Moreover, in FIG. 16, management information is assumed to be sent or received by the session for management information "sei", as illustrated in FIG. 2.

At first, in a case where a user of the terminal 10A, that is the request source terminal, turns on the power switch 109, illustrated in FIG. 5, the operation input acceptance unit 12, illustrated in FIG. 7, accepts the user's operation, and the power of the terminal 10A is turned ON (step S21). Then, the communication control unit 13, when receiving the operation for turning on the power, sends login request information, indicating a login required, to the management system 50 from the transmission/reception unit 11 via the communication network 2 (step S22). Transmission of the login request information by turning the power switch 109 ON is an example. For example, the login request information may be sent by an operation of the operation buttons 108 by the user.

Moreover, the login request information includes the terminal ID (request source terminal ID) for identifying the terminal 10A as the request source terminal and a password. The terminal ID and the password have been read out from the storage unit 1000 via the storage/readout process unit 17. Alternatively, the terminal ID and the password may be stored in the recording medium 1010 and may be read out from the recording medium 1010 or the like. Moreover, when the login request information is sent from the terminal 10A to the management system 50, the management system 50 on the reception side can recognize the IP address of the terminal 10A on the transmission side.

Next, the terminal authentication unit 52 of the management system 50 searches the above-described authentication management table 1002 with the terminal ID and the password as a search key included in the login request information received via the transmission/reception unit 51. The terminal authentication unit 52 performs terminal authentication by determining whether a combination of the terminal ID and the password included in the login request information received from the terminal 10A is included in the authentication management table 1002 (step S23).

In the case where the terminal authentication unit 52 determines that the login request information is from the terminal 10A, which has authorization for use, the terminal state management unit 53 changes an operational status corresponding to the terminal ID "01aa" of the terminal 10A stored in the terminal management table 1003 to "online (communication ok)". At this time, the terminal state management unit 53 updates a reception date/time, and as necessary, the IP address of the terminal 10 is updated (step S24). Accordingly, the terminal management table 1003 manages the operational status "online (communication ok)", the reception time "20xx.4.10.13:40", and the IP address of the terminal 10aa "1.2.1.3", associated with the terminal ID "01aa" of the terminal 10A.

Then, the transmission/reception unit 51 of the management system 50 sends authentication result information, indicating a result of the authentication obtained by the terminal authentication unit 52, via the communication network 2, to the request source terminal 10A, which has required the login (step S25). In the following, a process when the terminal authentication unit 52 determines that the request source terminal has authorization for use will be explained.

The terminal extraction unit 54 of the management system 50 searches the destination list management table 1101 with the terminal ID "01aa" of the request source terminal which has required the login (terminal 10A) as a search key. Then, the terminal extraction unit 54 extracts a terminal ID of a candidate of a destination terminal, which can communicate with the request source terminal (terminal 10A) (step S26). In the embodiment, for example, as terminal IDs of the destination terminals corresponding to the terminal ID "01aa" of the request source terminal (terminal 10A), terminal IDs "01ab", "01ba" and "01db" are assumed to be extracted.

Next, the terminal state acquisition unit 55 searches the terminal management table 1003 with the terminal IDs ("01ab", "01ba", "01db") of the candidates of the destination terminal extracted by the above-described terminal extraction unit 54 as a search key. Accordingly, the terminal state acquisition unit 55 reads out an operational status for each of the terminal IDs extracted by the terminal extraction unit 54, to acquire respective operational statuses of the terminal IDs ("01ab", "01ba", "01db") (step S27).

Next, the transmission/reception unit 51 sends destination status information including the operational statuses of the terminal IDs ("01ab", "01ba" and "01db") of the candidates of the destination terminal to the request source terminal (terminal 10A) via the communication network 2 (step S28). Accordingly, the request source terminal (terminal 10A) can recognize the operational status at present of each of terminal IDs ("01ab", "01ba" and "01db") of the candidates of the destination terminal for the request source terminal (terminal 10A).

Furthermore, the terminal extraction unit 54 of the management system 50 searches the destination list management table 1101 with the terminal ID "01aa" of the request source terminal (terminal 10A), which has required the login, as a search key. Therefore, the terminal extraction unit 54 extracts other request source terminal IDs, for each of which the terminal ID "01aa" of the request source terminal (terminal 10A) is registered as a candidate of a destination terminal (step S29). In the destination list management table 1101, illustrated in FIG. 11A, the terminal IDs of the other request source terminals extracted as above, are "01ab", "01ba" and "01db".

Next, the terminal state acquisition unit 55 of the management system 50 searches the terminal management table 1003 with the terminal ID "01aa" of the request source terminal (terminal 10A), which required the login, as a search key. Therefore, the terminal state acquisition unit 55 acquires an operational status of the request source terminal (terminal 10A) which required the login (step S30).

Then, the transmission/reception unit 51 extracts the terminal IDs ("01ba" and "01db") with the operational status of "online (communication ok)", in the terminal management table 1003, out of the terminal IDs ("01ab", "01ba" and "01db") extracted at step S29. Moreover, the transmission/reception unit 51 sends, to the terminal 10B and the terminal 10C corresponding to the extracted terminal IDs ("01ba", "01db"), destination status information including the terminal ID "01aa" of the request source terminal (terminal 10A) and the operational status of "online (communication ok)" (steps S31-1 and S31-2).

Upon the transmission/reception unit 51 sending the destination status information to the terminals 10B and 10C, based on the terminal IDs ("01ba" and "01db"), the transmission/reception unit 51 refers to the IP addresses of the terminals managed in the terminal management table 1003. Accordingly, the transmission/reception unit 51 can transfer to each of the destination terminals 10B and 10C, which can communicate with the request source terminal (terminal 10) having required the login, as a destination, the terminal ID "01aa" of the request source terminal (terminal 10A) and the operational status of "online (communication ok)".

On the other hand, also in the other terminals 10, for example, when the user turns on the power switch 109, illustrated in FIG. 6, in the same way as step S21, the operation input acceptance unit 12, illustrated in FIG. 7, accepts the operation for the power to be ON, and the same processes as in steps S22 to S31-1 and S31-2 are performed.

(Communication Process)

Figure 17:
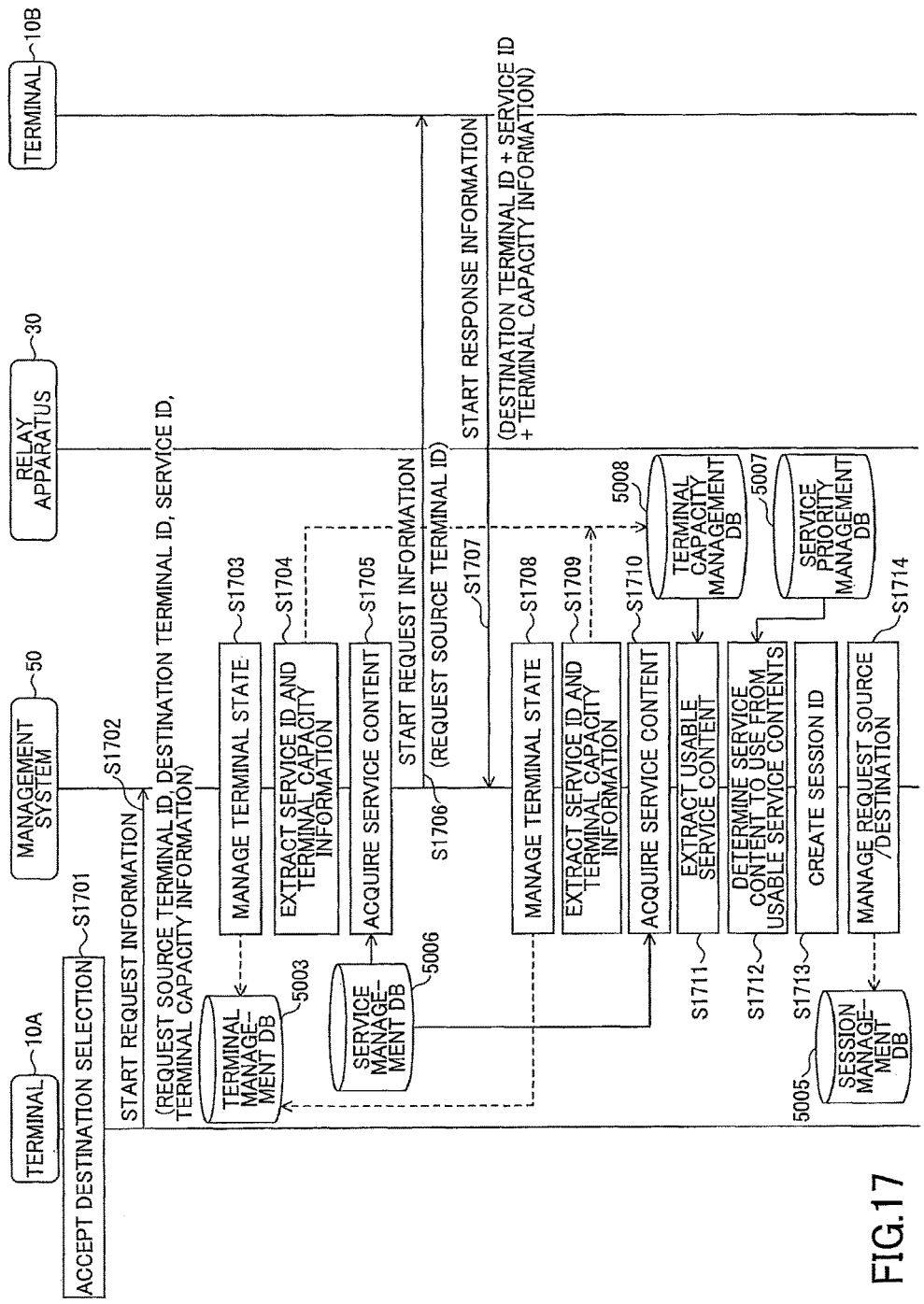
FIG. 17 is a sequence diagram illustrating an example of a communication process in the transmission system according to the embodiment.
Figure 18:
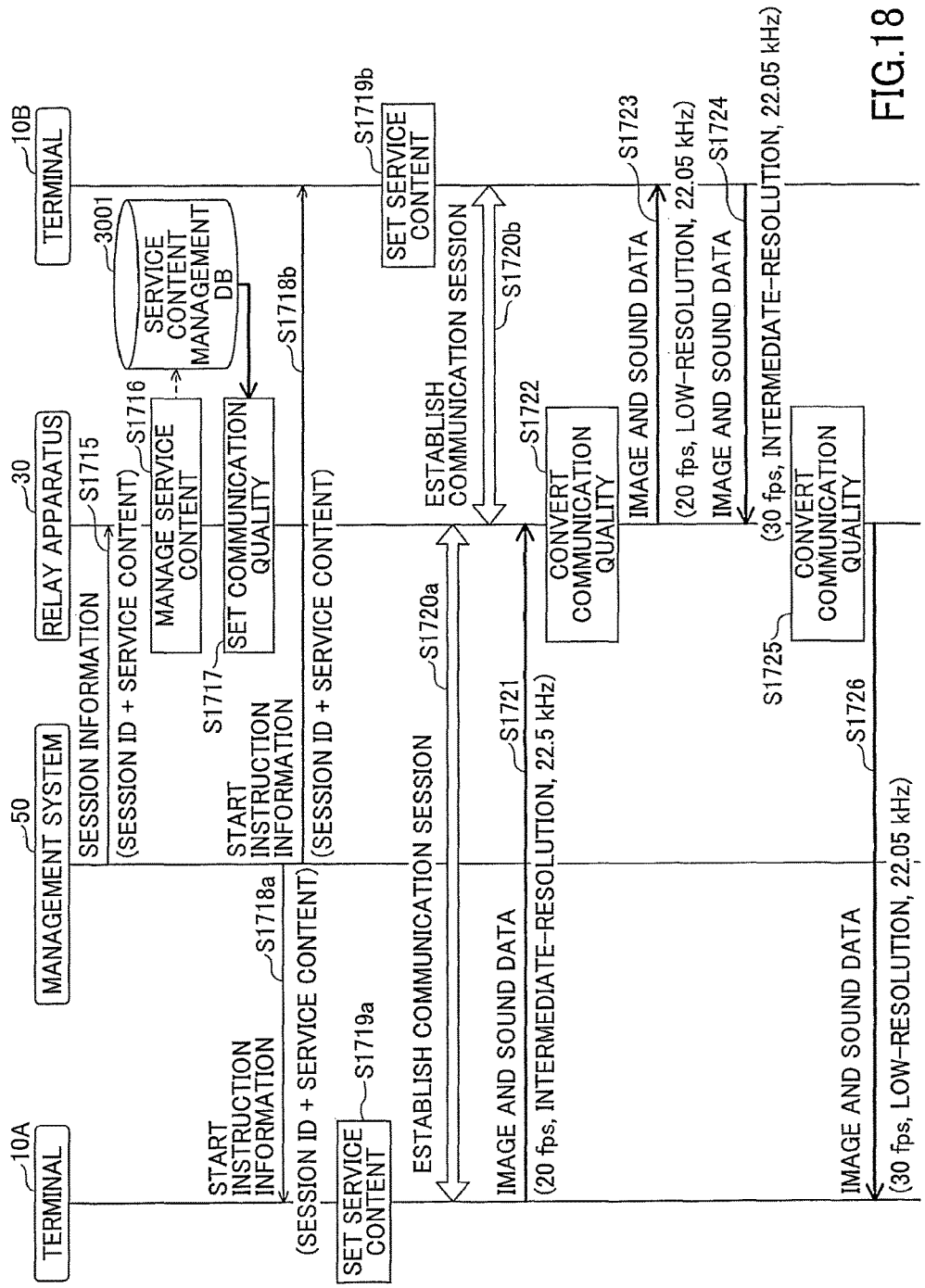
FIG. 18 is a sequence diagram illustrating another example of the communication process in the transmission system according to the embodiment.

FIGS. 17 and 18 are sequence diagrams illustrating an example of a communication process of the transmission system according to the embodiment. Also in FIGS. 17 and 18, various pieces of management information are assumed to be sent or received by the session for management information "sei" illustrated in FIG. 2. Moreover, here, an example of a case where content data are transferred between the terminal 10A and the terminal 10B will be described.

When the terminal 10A accepts a selection operation for a destination terminal (terminal 10B) by the user of the terminal 10A (step S1701), the terminal 10A sends start request information requesting the management system 50 to start a session (step S1702). The start request information includes, for example, a request source terminal ID of the terminal 10A which is a request source terminal, destination terminal ID of the terminal 10B which is a destination terminal, a service ID of the terminal 10A, terminal capacity information of the terminal 10A and the like. Moreover, the start request information also includes an IP address of the terminal 10A (request source IP address).

The terminal state management unit 53 of the management system 50, which receives the start request information from the terminal 10A, based on the terminal ID "01aa" of the request source terminal (terminal 10A) included in the start request information, updates the terminal management DB 5003 (step S1703). For example, the terminal state management unit 53 changes the information of the operational status corresponding to the terminal ID "01aa" of the terminal 10A to "online (communication OK)" and updates also information on reception date/time.

The service ID acquisition unit 57b of the management system 50 extracts a service ID included in the start request information received from the terminal 10A (step S1704). Moreover, the terminal capacity acquisition unit 57f extracts terminal capacity information included in the start request information received from the terminal 10A, and stores the extracted information into the terminal capacity management DB 5008.

The service information management unit 57a of the management system 50 acquires, from the service management DB 5006, service content corresponding to the service ID of the terminal 10A acquired by the service ID acquisition unit 57a (step S1705). For example, the service information management unit 57a acquires, from the service management table 1201 illustrated in FIG. 12, quality (frame rate, image quality, sampling rate and the like) of the content data corresponding to the service ID of the terminal 10A.

The session control unit 56a of the management system 50 sends the start request information for requiring starting a session to the terminal 10B which is one of the destination terminals (step S1706). The start request information includes, for example, a request source terminal ID of the terminal 10A that is the request source terminal.

The terminal 10B which receives the start request information from the management system 50 sends start response information to the management system 50 (step S1707). The start response information includes, for example, the destination terminal ID of the terminal 10B, a service ID, terminal capacity information and the like.

The terminal state management unit 53 of the management system 50 that receives the start response information from the terminal 10B, based on the terminal ID "01ba" of the terminal 10B included in the start response information, updates the terminal management DB 5003 (step S1708). For example, the terminal state management unit 53 changes information on an operational state corresponding to the terminal ID "01ba" of the terminal 10B to "online (communication ok)", and updates information on reception date/time.

The service ID acquisition unit 57b of the management system 50 extracts the service ID included in the start response information received from the terminal 10B (step S1709). Moreover, the terminal capacity acquisition unit 57f extracts terminal capacity information included in the start request information received from the terminal 10B, and stores the terminal capacity information in the terminal capacity management DB 5008.

The service information management unit 57a of the management system 50 acquires, from the service management DB 5006, service content corresponding to the service ID of the terminal 10B acquired by the service ID acquisition unit 57a (step S1710). For example, the service information management unit 57a acquires, from the service management table 1201 illustrated in FIG. 12, quality of the content data corresponding to the service ID of the terminal 10B (frame rate, image quality, sampling rate and the like).

When data transmission for contents is performed among three or more terminals 10, the management system 50 executes processes of steps S1706 through S1709 for the third and following terminals 10, and acquires service content and terminal capacity information corresponding to the service ID of each terminal 10.

The extraction unit 57d extracts service content that each terminal 10 can use, based on the service content of each terminal 10 acquired in steps S1702 through S1710 and the terminal capacity information of each terminal 10 stored in the terminal capacity management DB 5008 (step S1711).

For example, the extraction unit 57d extracts service content of the terminal 10A participating in the session, so as to fulfill service content corresponding to the service identification information of the terminal 10A, and to fulfill service content corresponding to the terminal capacity information of the terminal 10A.

As an example, when a service ID of the terminal 10A is "sv901" illustrated in FIG. 12 and a terminal ID of the terminal 10A is "01aa" illustrated in FIG. 13, a "reception frame rate" provided to the service ID "sv901" is 30 fps and 20 fps. Moreover, a "reception frame rate" that the terminal ID "01aa" can use is 30 fps and 20 fps. In this case, the extraction unit 57c extracts the "reception frame rate" of 30 fps and 20 fps that fulfills the service content corresponding to the service identification information of the terminal 10A and fulfills the service content corresponding to the terminal capacity information of the terminal 10A.

As another example, when a service ID of the terminal 10B is "sv902" illustrated in FIG. 12 and a terminal ID of the terminal 10B is "01ab" illustrated in FIG. 13, a "transmission frame rate" provided to the service ID "sv902" is 40 fps and 30 fps. Moreover, a "transmission frame rate" that the terminal ID "01ab" can use is 30 fps and 20 fps. In this case, the extraction unit 57c extracts the "transmission frame rate" of 30 fps that fulfills the service content corresponding to the service identification information of the terminal 10B and fulfills the service content corresponding to the terminal capacity information of the terminal 10B.

In this way, the extraction unit 57c extracts service content that each terminal 10 participating in the session can use, for example, for each quality item.

Furthermore, the extraction unit 57d extracts service content of each terminal 10 so that a quality of content data sent by the terminal 10 is more than or equal to a quality of content data received by the other terminal 10 participating in the session. Moreover, the extraction unit 57d extracts service content of each terminal 10 so that a quality of content data received by the terminal 10 is less than or equal to a quality of content data sent by the other terminal 10 participating in the session.

For example, when the reception frame rate of the terminal 10A is 30 fps or 20 fps, and the transmission frame rate of the terminal 10B is 30 fps, the extraction unit 57d extracts 30 fps that is more than or equal to the transmission frame rate of the terminal 10B as the reception frame rate of the terminal 10A.

A specific method for extracting service content that each terminal 10 can use will be described later.

The determination unit 57e of the management system 50 determines service content for the terminals 10A and 10B participating in the session from service contents that can be used in the terminals 10A and 10B (step S1712). For example, when there are a plurality of service contents for the terminal 10 extracted in step S1711, the determination unit 57e determines the service content for each terminal 10 from the plurality of service contents, based on the service priority management DB 5007 that stores preliminarily prioritized quality content.

For example, assume that the "reception frame rate" of the service content for the terminal 10A extracted in step S1711 is 30 fps and 20 fps. In this case, the determination unit 57e determines, for example, the "reception frame rate" to be 30 fps following "GREATER IS PRIORITIZED" indicated by "reception frame rate" of "the service ID "901" in the service priority management table 1401 illustrated in FIG. 14.

In the same way as above, when there are a plurality of extracted service contents, the determination unit 57e selects one service content for each quality item with reference to the service priority management DB 5007.

The session control unit 56a of the management system 50 creates a session ID that is identification information for identifying the session (step S1713).

The session information management unit 56b stores the created session ID in the session management DB 5005 in association with the request source terminal ID (terminal ID of the terminal 10A) and the destination terminal ID (terminal IDs of the terminal 10B and the terminal 10C) (step S1714).

With reference to FIG. 18, description of sequence diagram will be continued.

The session control unit 56a of the management system 50 sends session information to the relay apparatus 30 (step S1715). The session information includes, for example, information such as the session ID created in step S1713, and the service content for the terminals 10A and 10B determined in step S1712.

The service content management unit 33a of the relay apparatus 30, receiving the session information sent from the management system 50, stores the service content of each terminal 10 included in the received session information in the service content management DB 3001, to manage (step S1716).

The quality setting unit 33b of the relay apparatus 30 performs setting for the quality changing unit 32 of the relay apparatus 30 based on the service content of each terminal 10 stored in the service content management DB 3001 (step S1717). Accordingly, the quality changing unit 32 automatically converts the quality of the content that the transmission/reception unit (transfer unit) 31 transfers to each of the terminals 10A to 10C depending on the quality stored in the service content management table 1501.

The session control unit 56a of the management system 50 sends start instruction information for instructing the terminal 10A to start a session (step S1718a). Similarly, the session control unit 56a of the management system 50 sends start instruction information for instructing the terminal 10B to start a session (step S1718b). The start instruction information includes a session ID that is identification information of the session and information on service content for each terminal 10 and the like.

The terminal 10A sets the service content included in the received start instruction information (step S1719a), and establishes a communication session (session "sed") with the relay apparatus 30 (step S1720a). Similarly, the terminal 10B sets the service content included in the received start instruction information (step S1719b), and establishes a communication session (session "sed") with the relay apparatus 30 (step S1720b).

According to the above-described processes, the terminals 10A and 10B become able to participate in the same communication session and send/receive content data, such as image data or sound data to/from each other.

For example, assume that the established session illustrated in FIGS. 17 and 18 is a session ID "se001" in the service content management table 1501 illustrated in FIG. 15, the terminal ID of the terminal 10A is "01aa", and the terminal ID of the terminal 10B is "01ad". The description is as follows.

The terminal 10A sends the content data (e.g. image data and sound data) with the transmission frame rate of "20 fps", the transmission image quality of "intermediate-resolution" and the transmission sampling rate of "22.05 kHz" to the relay apparatus (step S1721).

The relay apparatus 30 that receives the content data from the terminal 10A converts the quality of the received content data by the quality changing unit 32, and forwards (relays) the content data to the terminal 10B by the transmission/reception unit (transfer unit) 31 (step S1722).

For example, according to the service content management table 1501, illustrated in FIG. 15, the terminal 10B (terminal ID: 01ab) can receive directly an image sent by the terminal 10A (terminal ID: 01aa) with 20 fps. Moreover, the terminal 10B can receive directly sound data sent by the terminal 10A with a sampling rate of 22.05 kHz. On the other hand, because a reception image quality of the terminal 10B is "low-resolution", and the terminal 10B cannot directly receive an image from the terminal 10A. In this case, the relay apparatus 30 converts an image of "intermediate-resolution" received from the terminal 10A into an image of "low-resolution", and sends the converted image data to the terminal 10B (step S1723).

Similarly, the terminal 10B sends content data to the relay apparatus with a transmission frame rate of "30 fps", a transmission image quality of "intermediate-resolution" and a transmission sampling rate of "22.05 kHz" (step S1724).

The relay apparatus 30 that receives the content data from the terminal 10B converts the quality of the received content data by the quality changing unit 32, and forwards (relays) the content data to the terminal 10A by the transmission/reception unit (transfer unit) 31 (step S1725).

For example, according to the service content management table 1501, illustrated in FIG. 15, the terminal 10A (terminal ID: 01aa) can receive directly an image sent by the terminal 10B (terminal ID: 01ab) with 30 fps. Moreover, the terminal 10B can receive directly sound data sent by the terminal 10A with a sampling rate of 22.05 kHz. On the other hand, because a reception image quality of the terminal 10A is "low-resolution", and the terminal 10A cannot directly receive an image from the terminal 10B. In this case, the relay apparatus 30 converts an image of "intermediate-resolution" received from the terminal 10B into an image of "low-resolution", and sends the converted image data to the terminal 10A (step S1726).

According to the above-described processes, and according to the transmission system 1 of the embodiment, in a transmission system 1 that transfers content data via the relay apparatus 30, service content according to capacity of the terminal 10 can be easily determined.

<Determination Process of Service Content>

In an example illustrated in FIGS. 17 and 18, a case with two terminals 10 is described. The embodiment can be applied to a case with three or more terminals 10. Here, for the sake of simplicity for description, the case with three terminals 10 will be described. Even in a case with other number of terminals 10, the same processes can be performed.

Figure 19:
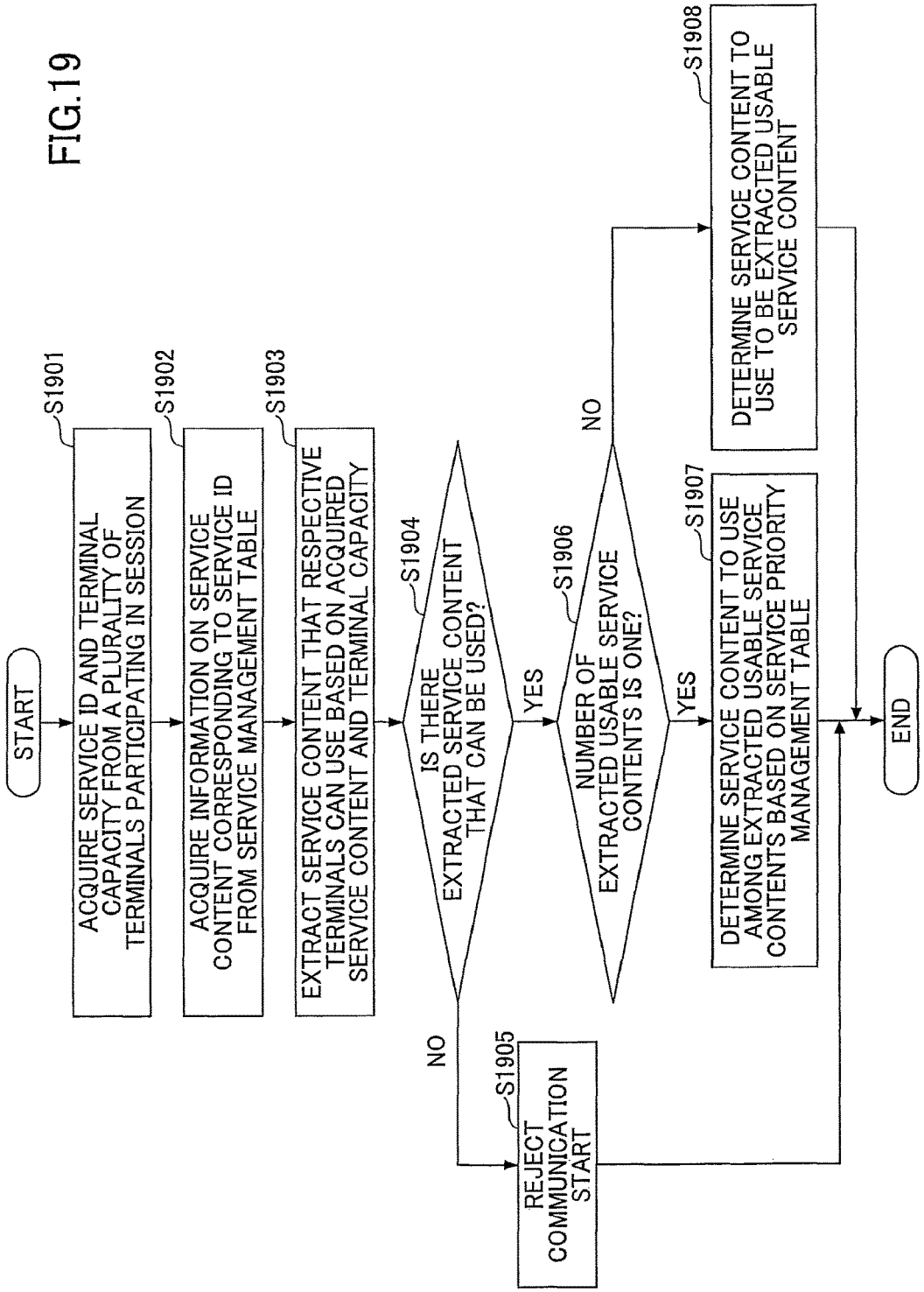
FIG. 19 is a flowchart illustrating an example of a flow of a process for determining service contents according to the embodiment.

FIG. 19 is a flowchart illustrating an example of a flow of a process for determining service content according to the embodiment.

The service ID acquisition unit 57b and the terminal capacity acquisition unit 57f of the management system 50 acquires a service ID of each terminal 10 participating in a session and information of terminal capacity (step S1901). The process corresponds, for example, to the process in steps S1704 and S1709 in FIG. 17. When the number of terminals 10 is three, the service ID acquisition unit 57b and the terminal capacity acquisition unit 57f execute, for example, the process in steps S1706 through S1709 in FIG. 17 for the third terminal 10.

The service ID acquisition unit 57b of the management system 50 acquires information on service content corresponding to a service ID of each terminal 10 from the service management table 1201 included in the service management DB 5006 (step S1902). The process corresponds, for example, to the process in steps S1705, S1710 or the like in FIG. 7.

The extraction unit 57d of the management system 50 extracts service content that each terminal 10 can use, based on the acquired service content corresponding to the service ID of each terminal 10 and service content corresponding to terminal capacity information (step S1903). The process corresponds, for example, to the process in step S1711 in FIG. 17.

Figure 20:
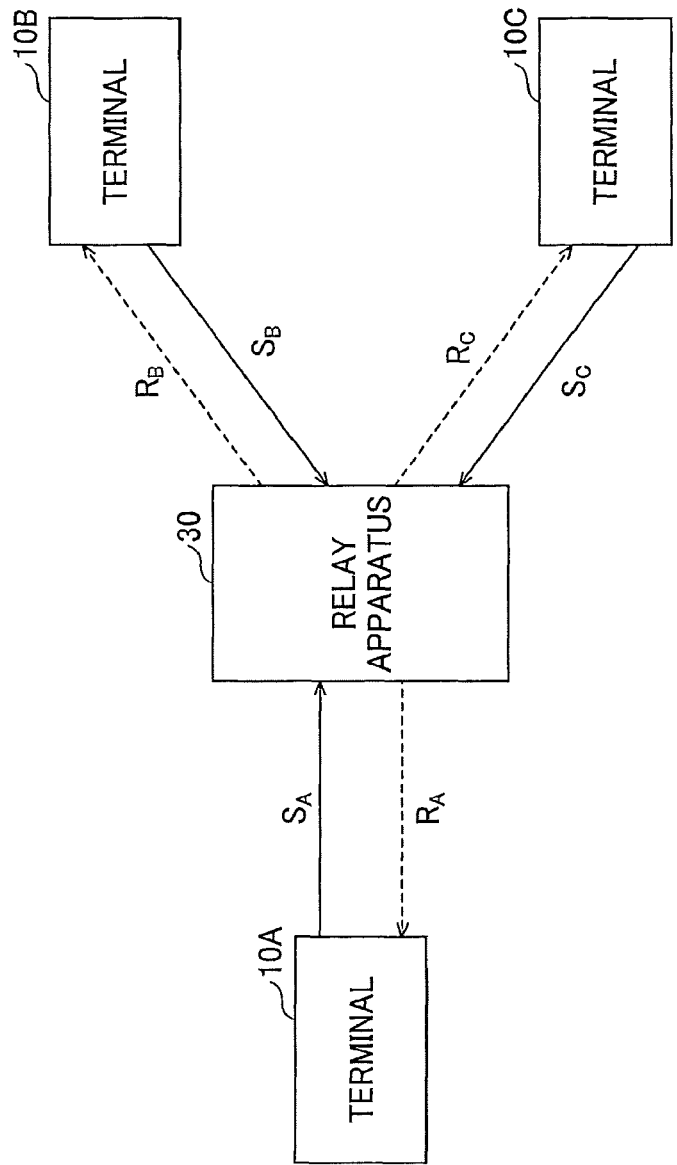
FIG. 20 is a diagram for explaining the process for determining service contents according to the embodiment.

FIG. 20 is a diagram for explaining a process for determining service content according to the embodiment. For example, as illustrated in FIG. 20, assume that the terminals 10 participating in the session are a terminal 10A, a terminal 10B and a terminal 10C. Moreover, the transmission qualities and reception qualities for the terminals 10A, 10B and 10C are assumed to be $S_A$, $S_B$ and $S_C$, and $R_A$, $R_B$ and $R_C$, respectively.

In this case, the extraction unit 57d obtains transmission qualities and reception qualities $R_A$, $R_B$ and $R_C$ of the respective terminals 10A, 10B and 10C that fulfill the following formulas (1) through (4).

For example, discrete sets indicating quality of receivable content data based on service IDs of the respective terminals 10A, 10B and 10C are assumed to be $C_{rSA}$, $C_{rSB}$ and $C_{rSC}$. Similarly, discrete sets indicating quality of sendable content data based on the service IDS of the respective terminals 10A, 10B and 10C are assumed to be $C_{sDA}$, $C_{sDB}$ and $C_{sDC}$. An element of the discrete sets corresponds, for example, to a line in the service management table 1201 illustrated in FIG. 12. For example, when the service ID of the terminal 10A is "sv901", an element of $C_{rSA}$ includes "reception frame rate: 30 fps", "reception frame rate: 20 fps", "reception image quality: intermediate-resolution", "reception image quality: low-resolution", "reception sampling rate: 44.1 kHz", "reception sampling rate: 22.05 kHz", and the like.

Furthermore, terminal capacities on a transmission side of the respective terminals 10A, 10B and 10C are assumed to be discrete sets $C_{sDA}$, $C_{sDB}$ and $C_{sDC}$ that indicate qualities of content data that the respective terminals can send. Similarly, terminal capacities on a reception side of the respective terminals 10A, 10B and 10C are assumed to be discrete sets $C_{rDA}$, $C_{rDB}$ and $C_{rDC}$ that indicate qualities of content data that the respective terminals can receive. An element of the discrete sets corresponds, for example, to a line in the terminal capacity management table 1901, illustrated in FIG. 13. For example, when the service ID of the terminal 10A is "sv901", an element of $C_{sDA}$ includes "transmission frame rate: 40 fps", "transmission frame rate: 20 fps", "transmission image quality: intermediate-resolution", "transmission sampling rate: 44.1 kHz", "transmission sampling rate: 22.05 kHz", and the like.

At first, the extraction unit 57d causes the transmission qualities $S_A$, $S_B$ and $S_C$ of the respective terminals 10A, 10B and 10C participating in the session to be elements of the discrete sets $C_{sSA}$, $C_{sSB}$ and $C_{sSC}$, respectively, and causes to be elements of the discrete sets $C_{sDA}$, $C_{sDB}$ and $C_{sDC}$, respectively. This is expressed by the following formula (1).

[Formula 1]

$$s_A \in C_{sSA} \cap C_{sDA}$$

$$s_B \in C_{sSB} \cap C_{sDB}$$

$$s_C \in C_{sSC} \cap C_{sDC} \qquad (1)$$

The above-described operation corresponds, for example, to extracting the transmission quality $S_A$ of the terminal 10A so as to fulfill transmission quality corresponding to the service ID of the terminal 10A and fulfill transmission quality corresponding to terminal capacity information of the terminal 10A.

Moreover, the extraction unit 57d causes the reception qualities $R_A$, $R_B$ and $R_C$ of the respective terminals 10A, 10B and 10C participating in the session to be elements of the discrete sets $C_{rSA}$, $C_{rSB}$ and $C_{rSC}$, respectively, and causes to be elements of the discrete sets $C_{rDA}$, $C_{rDB}$ and $C_{rDC}$, respectively. This is expressed by the following formula (2).

[Formula 2]

$$r_A \in C_{rSA} \cap C_{rDA}$$

$$r_B \in C_{rSB} \cap C_{rDB}$$

$$r_C \in C_{rSC} \cap C_{rDC} \qquad (2)$$

The above-described operation corresponds, for example, to extracting the reception quality RA of the terminal 10A so as to fulfill reception quality corresponding to the service ID of the terminal 10A and fulfill reception quality corresponding to terminal capacity information of the terminal 10A.

Furthermore, the extraction unit 57d causes the transmission qualities $S_A$, $S_B$ and $S_C$ of the respective terminals 10A, 10B and 10C participating in the session to have quality greater than or equal to the greatest reception quality of the reception qualities of counterpart terminals to/from which contents are sent/received. This is expressed by the following formula (3).

[Formula 3]

$$s_A \geq \max(r_B, r_C)$$

$$s_B \geq \max(r_C, r_A)$$

$$s_C \geq \max(r_A, r_B) \qquad (3)$$

For example, in FIG. 20, the terminal 10A sends content data with transmission quality $S_A$ to the relay apparatus 30, and the relay apparatus 30 forwards the content data received from the terminal 10A to the terminal 10B with reception quality $R_B$, and to the terminal 10C with reception quality $R_C$. In this case, the transmission quality $S_A$ of the terminal 10A is preferably greater than or equal to the reception quality $R_B$ of the terminal 10B and the reception quality $R_C$ of the terminal 10C. This is because when the transmission quality $S_A$ of the terminal 10A is less than the reception quality $R_B$ of the terminal 10B or the reception quality $R_C$ of the terminal 10C, a problem may occur that an image quality is degraded, or a load of the relay apparatus 30 becomes greater.

Furthermore, the extraction unit 57d causes the reception qualities $R_A$, $R_B$ and $R_C$ of the respective terminals 10A, 10B and 10C participating in the session to have quality less than or equal to the smallest transmission quality of the transmission qualities of counterpart terminals to/from which contents are sent/received. This is expressed by the following formula (4).

[Formula 4]

$$r_A \leq \min(s_B, s_C)$$

$$r_B \leq \min(s_C, s_A)$$

$$r_C \leq \min(s_A, s_B) \qquad (4)$$

For example, in FIG. 20, the terminal 10B sends content data with transmission quality $S_B$ to the relay apparatus 30, and the terminal 10C sends content data with transmission quality $S_C$ to the relay apparatus 30. The relay apparatus 30 forwards the content data received from the terminals 10B and 10C to the terminal 10A with reception quality $R_A$. In this case, the reception quality $R_A$ of the terminal 10A is preferably less than or equal to the transmission quality $S_B$ of the terminal 10B and the transmission quality $S_C$ of the terminal 10C. This is because when the reception quality $R_A$ of the terminal 10A is greater than the transmission quality $S_B$ of the terminal 10B or the transmission quality $S_C$ of the terminal 10C, a problem may occur that an image quality is degraded, or a load of the relay apparatus 30 becomes greater.

The extraction unit 57d of the management system 50 extracts $S_A$, $S_B$, $S_C$, $R_A$, $R_B$ and $R_C$ that fulfill the above-described formulas (1) to (4), as service content that each terminal 10 participating in the session can use (step S1903 in FIG. 19).

The determination unit 57e of the management system 50 determines whether there is service content that each terminal 10 participating in the session can use (step S1904). Here, when there is not service content that each terminal 10 can use (step S1904: NO), the service content determination unit 57c proceeds to step 1905 and rejects starting communication. In contrast, when there is service content that each terminal 10 can use (step S1904: YES), the service content determination unit 57c causes the process to proceed to step S1906.

When the process proceeds to step S1906, the determination unit 57e determines whether a number of service contents extracted at step S1903 is one (step S1906). Here, when the number of the extracted service contents is one (step S1906: YES), the service content determination unit 57c determines the service content (transmission quality and reception quality) extracted to be service content of each terminal 10 (step S1907). In contrast, when there are more than one extracted service contents (step S1906: NO), the determination unit 57e causes the process to proceed to step S1908.

When the process proceeds to step S1907, the determination unit 57e determines service content that each terminal 10 uses from the extracted usable service contents, based on the service priority management table 1401 included in the service priority management DB 5007 (step S1907). For example, the determination unit 57e determines the service content of the terminal A (service ID: "sv901"), based on information of the terminal A included in the service priority management table 1401, illustrated in FIG. 14. For example, assume that the transmission sampling rates of the terminal A extracted by the extraction unit 57d are two rates of "44.1 kHz" and "22.05 kHz". In this case, the determination unit 57e "prioritize smaller sampling rate" based on the service priority management table 1401, and determines "22.05 kHz" to be the transmission sampling rate of the terminal A.

According to the above-described processes, the extraction unit 57d extracts the service content that the respective terminals 10 can use, based on the service content corresponding to the service ID and terminal capacity information of the terminals 10 participating in the session. Moreover, when there are a plurality of service contents that the respective terminals 10 can use, the determination unit 57e can determine service content for each terminal 10 from the usable service contents by using the service priority management DB 5007.

In the above-described description, the case where the number of terminals 10 is three is described. However, also when the number of terminals 10 is other than three, the service content of the session can be determined in the same way as the above-described case.

The above formulas (1) through (4) are preferred examples. It goes without saying that in response to requirement of a system, a system configuration or the like, a formula can be added, removed, changed or the like.

SUMMARY

A transmission management system (50) in the embodiment manages a session transmitting content data via a relay apparatus (30). The transmission management system (50) includes a service management unit (57) configured to manage service management information (5006), in which service identification information identifying service content provided to each of a plurality of transmission terminals (10), and service content corresponding to the service identification information are stored preliminarily; a first acquisition unit (57b) configured to acquire the service identification information of each of the transmission terminals (10) participating in the session; a second acquisition unit (57f) configured to acquire terminal capacity information indicating service content that each of the transmission terminals (10) participating in the session can use; an extraction unit (57d) configured to extract the service content that each of the transmission terminals (10) participating in the session can use, based on service content corresponding to the service identification information acquired by the first acquisition unit (57b) and service content corresponding to the terminal capacity information acquired by the second acquisition unit (57f); and a determination unit (57e) configured to determine service content of each of the transmission terminals (10) participating in the session, based on the extracted service content.

Accordingly, in a transmission system (1) that transfers content data via a relay apparatus (30), a management system (50) that facilitates determining service content depending on capacity of a transmission terminal (10) can be provided.

The above-described reference numerals in the parentheses are added in order to understand easily, are only examples, and do not restrict the scope of the present invention.

In transmission systems of the related art, according to recent improvement of broadband circumstances, it becomes possible to transmit/receive high-quality image data or high-quality sound data.

However, there are various kinds of transmission terminals, and depending of a kind of transmission terminal, quality of image data or sound data that can be sent or received is different.

For example, in a case of using a transmission terminal for remote medicine, in order to send an image of an affected part of a patient to a remote place, image data of high quality can be sent. In contrast, in a case of a security camera or the like that uses image data of relatively low quality, image data of high quality may not be sent.

Moreover, in a transmission system that determines service contents for transmission terminal based on identification information stored in a storage medium such as an SIM, a user may place an SIM on various transmission terminals having different transmission capacities to use.

Furthermore, because in a transmission system in which content data are sent via a relay apparatus, communication quality between transmission terminals may be converted, determining service content by the transmission system depending on a capacity of each transmission terminal is difficult.

According to the embodiment, a transmission management system that makes it easier to determine service content depending on a capacity of a transmission terminal in a transmission system, in which content data are transferred via a relay apparatus, can be provided.

[Supplement to Embodiment]

The relay apparatus 30, the management system 50 or the like in the embodiment may be configured with a single computer, or may be configured with several computers by dividing the respective units (functions or means) and allocating them arbitrarily to the computers.

Moreover, in FIGS. 10A through 11B, reception date/time is managed. However, this is not limiting, i.e. only reception time of the reception date/time has to be managed.

Furthermore, in the embodiment, a case of a video conference terminal is described as an example of the transmission terminal. This is not limiting. A telephone system of an IP (Internet Protocol) telephone, an internet telephone or the like may be employed. Moreover, a smartphone, a mobile telephone, a car navigation terminal, a wearable computer, a monitoring camera, an electronic whiteboard, a projector, a gaming machine, or industrial equipment having a communication function may be used. The wearable computer includes a wristwatch, a head mounted display or the like. Moreover, the industrial equipment includes office equipment such as a MFP (Multifunctional Peripheral/Printer/Product) or the like, medical equipment such as an endoscopic instrument, agricultural equipment such as a cultivator, or the like.

Moreover, in the embodiment, as an example of content data, image data and sound data are described. However, this is not limiting. Touch data may be employed. In this case, a sense of touch by a user on one terminal is transmitted to the other terminal. Furthermore, content data may be smell data. In this case, smell on one terminal is transmitted to the other terminals. Moreover, content data have only to be at least one of image data, sound data, touch data and smell data.

Further, the present invention is not limited to these embodiments, but various variations and modifications may be made without departing from the scope of the present invention.

What is claimed is:

1. A transmission management system for managing a session transmitting content data via a relay apparatus, the transmission management system comprising:
    a service management unit configured to manage service management information, in which service identification information identifying service content to be provided to each of a plurality of transmission terminals, and the service content corresponding to the service identification information;
    a first acquisition unit configured to acquire the service identification information via a network, the service identification information being recorded in a recording medium of each transmission terminal of the plurality of transmission terminals participating in the session;
    a second acquisition unit configured to acquire terminal capacity information indicating service content used by each transmission terminal of the plurality of transmission terminals participating in the session;
    an extraction unit configured to extract service content from the service management information, the service content satisfying service content corresponding to the service identification information and satisfying service content available for each of the transmission terminals participating in the session, based on service content corresponding to the terminal capacity information acquired by the second acquisition unit;
    a determination unit configured to determine service content of each of the transmission terminals based on the service content extracted by the extraction unit; and
    a transmission unit configured to send, to the plurality of transmission terminals, start instruction information to start establishing the session in order to transmit the content data via the relay apparatus, based on the service content determined by the determination unit, wherein
    the service content includes information indicating a quality of content data that the transmission terminal sends and the quality of content data that the transmission terminal receives, and
    the quality of content data includes at least one of a quality item of a frame rate, a bit rate, a resolution, an image quality or a color depth of image data.

2. The transmission management system according to claim 1, wherein the extraction unit is configured to extract the service content from the service management information so that the quality of content data that the transmission terminal sends is more than or equal to a quality of content data that another transmission terminal participating in the session receives.

3. The transmission management system according to claim 1, wherein the extraction unit is configured to extract the service content from the service management information so that the quality of content data that the transmission terminal receives is less than or equal to a quality of content data that another transmission terminal participating in the session sends.

4. The transmission management system according to claim 1, wherein when there are a plurality of service contents of the transmission terminal extracted by the extraction unit, the determination unit is configured to determine the service content of the transmission terminal among the plurality of service contents, based on service priority information that stores a prioritized quality item of the service content.

5. A transmission system comprising:
    the transmission management system according to claim 1;
    a readout unit configured to read out the service identification information from a recording medium in which the service identification information is recorded; and
    a communication control unit configured to send control information for the session, the control information including the read out service identification information and terminal capacity information indicating service content available for the transmission terminal, to the transition management system.

6. An information processing apparatus for managing a session transmitting content data via a relay apparatus, the information processing apparatus comprising:
- a service management means for managing service management information, in which service identification information identifying service content to be provided to each of a plurality of transmission terminals, and the service content corresponding to the service identification information;
- a first acquisition means for acquiring the service identification information via a network, the service identification information being recorded in a recording medium of each transmission terminal of the plurality of transmission terminals participating in the session;
- a second acquisition means for acquiring terminal capacity information indicating service content used by each transmission terminal of the plurality of transmission terminals participating in the session;
- an extraction means for extracting service content from the service management information, the service content satisfying service content corresponding to the service identification information and satisfying service content available for each of the transmission terminals participating in the session, based on service content corresponding to the terminal capacity information acquired by the second acquisition means;
- a determination means for determining service content of each of the transmission terminals based on the service content extracted by the extraction means; and
- a transmission means configured to send, to the plurality of transmission terminals, start instruction information to start establishing the session in order to transmit the content data via the relay apparatus, based on the service content determined by the determination means, wherein
- the service content includes information indicating a quality of content data that the transmission terminal sends and the quality of content data that the transmission terminal receives, and
- the quality of content data includes at least one of a quality item of a frame rate, a bit rate, a resolution, an image quality or a color depth of image data.

7. A transmission management method for managing a session transmitting content data via a relay apparatus, the method comprising:
- managing service management information, in which service identification information for identifying service content to be provided to each of a plurality of transmission terminals, and the service content corresponding to the service identification information;
- acquiring the service identification information via a network, the service identification information being recorded in a recording medium of each transmission terminal of the plurality of transmission terminals participating in the session;
- acquiring terminal capacity information indicating service content used by each transmission terminal of the plurality of transmission terminals participating in the session;
- extracting service content from the service management information, the service content satisfying service content corresponding to the service identification information and satisfying service content available for each of the transmission terminals participating in the session, based on service content corresponding to the terminal capacity information;
- determining service content of each of the transmission terminals based on the extracted service content; and
- sending, to the plurality of transmission terminals, start instruction information to start establishing the session in order to transmit the content data via the relay apparatus, based on the determined service content, wherein
- the service content includes information indicating a quality of content data that the transmission terminal sends and the quality of content data that the transmission terminal receives, and
- the quality of content data includes at least one of a quality item of a frame rate, a bit rate, a resolution, an image quality or a color depth of image data.

* * * * *